US010916235B2

(12) United States Patent
Pinson et al.

(10) Patent No.: US 10,916,235 B2
(45) Date of Patent: Feb. 9, 2021

(54) SYLLABLE BASED AUTOMATIC SPEECH RECOGNITION

(71) Applicant: Vox Frontera, Inc., Silver Spring, MD (US)

(72) Inventors: Mark B. Pinson, Pleasant Grove, UT (US); Darrel T. Pinson, Payson, UT (US)

(73) Assignee: VOX FRONTERA, INC., Silver Spring, MD (US)

( * ) Notice: Subject to any disclaimer, the term of this patent is extended or adjusted under 35 U.S.C. 154(b) by 0 days.

(21) Appl. No.: 16/031,637

(22) Filed: Jul. 10, 2018

(65) Prior Publication Data

US 2019/0013009 A1    Jan. 10, 2019

Related U.S. Application Data

(60) Provisional application No. 62/530,802, filed on Jul. 10, 2017.

(51) Int. Cl.
| | |
|---|---|
| *G10L 15/02* | (2006.01) |
| *G10L 15/187* | (2013.01) |
| *G10L 15/34* | (2013.01) |
| *G10L 15/197* | (2013.01) |
| *G10L 15/06* | (2013.01) |

(52) U.S. Cl.
CPC .......... *G10L 15/02* (2013.01); *G10L 15/187* (2013.01); *G10L 15/197* (2013.01); *G10L 15/34* (2013.01); *G10L 2015/027* (2013.01); *G10L 2015/0633* (2013.01)

(58) Field of Classification Search
CPC .............. G10L 2015/027; G10L 2015/0633
See application file for complete search history.

(56) References Cited

U.S. PATENT DOCUMENTS

| | | | | |
|---|---|---|---|---|
| 3,812,291 A * | 5/1974 | Brodes | ..................... | G10L 15/02 704/253 |
| 6,108,627 A * | 8/2000 | Sabourin | ............... | G10L 15/187 704/10 |
| 6,138,099 A * | 10/2000 | Lewis | ..................... | G10L 15/22 704/235 |
| 9,959,870 B2 * | 5/2018 | Hunt | ....................... | G10L 15/26 |
| 2003/0110035 A1 * | 6/2003 | Thong | .................. | G10L 15/083 704/254 |
| 2004/0006469 A1 * | 1/2004 | Kang | ..................... | G10L 13/08 704/254 |
| 2004/0172247 A1 * | 9/2004 | Yoon | ..................... | G10L 15/187 704/251 |
| 2005/0216267 A1 | 9/2005 | Kustner et al. | | |

(Continued)

OTHER PUBLICATIONS

The International Searching Authority, "Search Report" In application No. PCT/US 18/41395, dated Sep. 26, 2018, 12 pages.

(Continued)

*Primary Examiner* — Paras D Shah
(74) *Attorney, Agent, or Firm* — Elliot H. Karlin; Hickman Palermo Becker Bingham LLP

(57) ABSTRACT

Systems, methods, and computer programs are described which utilize the structure of syllables as an organizing element of automated speech recognition processing to overcome variations in pronunciation, to efficiently resolve confusable aspects, to exploit context, and to map the speech to orthography.

28 Claims, 17 Drawing Sheets

(56) References Cited

U.S. PATENT DOCUMENTS

| | | | |
|---|---|---|---|
| 2006/0100871 A1* | 5/2006 | Choi | G10L 15/22 704/254 |
| 2007/0061143 A1* | 3/2007 | Wilson | G06F 17/2205 704/252 |
| 2008/0052069 A1 | 2/2008 | Flanagan et al. | |
| 2008/0172224 A1* | 7/2008 | Liu | G10L 15/187 704/220 |
| 2011/0123965 A1* | 5/2011 | Yu | G09B 19/04 434/156 |
| 2011/0238412 A1* | 9/2011 | Ezzat | G10L 15/187 704/10 |
| 2012/0116756 A1* | 5/2012 | Kalinli | G10L 15/1807 704/207 |
| 2013/0166297 A1 | 6/2013 | Mathias et al. | |
| 2013/0191115 A1* | 7/2013 | Suzuki | G10L 21/06 704/9 |
| 2013/0191126 A1* | 7/2013 | Thambiratnam | G10L 15/187 704/245 |
| 2013/0325449 A1* | 12/2013 | Levien | G10L 15/30 704/201 |
| 2015/0073794 A1 | 3/2015 | Kalinli-Akbacak et al. | |
| 2015/0112675 A1* | 4/2015 | Zhang | G10L 15/187 704/235 |
| 2015/0112679 A1 | 4/2015 | Zhang | |
| 2015/0243278 A1* | 8/2015 | Kibre | G10L 15/075 704/243 |
| 2017/0365251 A1* | 12/2017 | Park | G10L 15/187 |

OTHER PUBLICATIONS

Current Claims in application No. PCT/US 18/41395, dated Sep. 2018, 11 pages.

The International Bureau of WIPO, "International Preliminary Report on Patentability", in application No. PCT/US2018/041395, dated Jan. 14, 2020, 10 pages.

Current Claims in application No. PCT/US2018/04139, dated Jan. 2020, 11 pages.

* cited by examiner

Orthography:

Pronunciation:

| Consonants | | Nuclei | |
|---|---|---|---|
| IPA | Klattese | IPA | Klattese |
| p | p | i | i |
| t | t | ɪ | I |
| k | k | ɛ | E |
| b | b | e | e |
| d | d | æ | @ |
| g | g | ɑ | a |
| t͡ʃ | C | ɑu | W |
| d͡ʒ | J | ɑɪ | J |
| s | s | ʌ | ^ |
| ʃ | S | ɔ | c |
| z | z | ɔɪ | O |
| ʒ | Z | o | o |
| f | f | ʊ | u |
| θ | T | u | U |
| v | v | ɝ | R |
| ð | D | ə | x |
| h | h | ɨ | \| |
| n | n | ɚ | X |
| m | m | n̩ | N |
| ŋ | G | m̩ | M |
| l | l | l̩ | L |
| ɹ | r | | |
| w | w | # | break |
| j | y | ' | stress |

FIG. 2

Production IVC = /T/

|  |  | Pre-Normalization | | Post Normalization (est.) | |
|---|---|---|---|---|---|
| ╭ 1200 | ╭ 1201 | ╭ 1202 | ╭ 1203 | | |
| T | 0.95219800 | T | 0.95219800 | T | 0.098 |
| TD | 0.01747250 ⎤ | D | 0.00344322 | D | 0.006 |
| rT | 0.00377289 ⎥ | Tr | 0.00340659 | Tr | 0.005 |
| tT | 0.00373626 ⎦ | s | 0.00047619 | s | 0.0008 |
| D | 0.00344322 | • | | • | |
| Tr | 0.00340659 | • | | • | |
| TT | 0.00318681 ⎤ | • | | • | |
| Th | 0.00245421 ⎥ | d | 3.663e-05 | d | 3.663e-05 |
| vT | 0.00161172 ⎦ | v | 3.663e-05 | v | 3.663e-05 |
|  |  | st | 3.663e-05 | st | 3.663e-05 |

•
•
• tsT   3.663e-05 rTD   3.663e-05 rTh   3.663e-05

FIG. 12

SYLLABLE BASED AUTOMATIC SPEECH RECOGNITION

BENEFIT CLAIM

This application claims the benefit under 35 U.S.C. § 119(e) of provisional application 62/530,802, filed Jul. 10, 2017, the entire contents of which is hereby incorporated by reference for all purposes as if fully set forth herein.

FIELD OF THE DISCLOSURE

One technical field of the disclosure is computer-implemented speaker-independent automatic speech recognition. Another technical field is automatically transforming symbols representing speech from recorded audio signals into text that can be displayed on a continuous basis, such as for graphical text captions of audiovisual programs. The disclosure generally relates to the conversion of spoken words to text or other symbolic representations including automatic transcription of speech.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In some applications of automatic speech recognition (ASR), such as automatically generating and displaying text captions corresponding to speech that is spoken during a live television broadcast, there is a need for high word accuracy, little or no delay from the time the words are spoken until the corresponding transcription text is available, and the capability to produce good results even if the spoken words are not part of a pre-defined vocabulary list. There is also a need for ASR systems which are more computationally efficient, less energy-intensive, and which can function at full capability on distributed computational devices even when disconnected from the cloud.

SUMMARY

An objective of the disclosure is to convert an input stream of symbols representing sounds as produced by a speaker and as automatically assigned to symbolic form by analysis of acoustical characteristics to an output stream of corresponding transcribed orthographic patterns. It is also an objective to produce accurate transcripts of intended words even on the frequent occasions when the produced sounds vary significantly from the canonical pronunciations. It is a further objective to produce reasonable transcriptions even for words which were not in the reference dictionary utilized during the training of the system, in other words, to mitigate the "out-of-vocabulary" problem. It is a further objective to minimize the delay ("latency") between the production of speech and the generation of corresponding transcribed orthographic patterns. It is a further objective to accomplish the aforementioned objectives with low computational complexity. The syllable is the basic temporal structuring unit of speech. Several aspects of the disclosure organize processing steps around the syllable and its internal structure to segment, align, synchronize, map, and model to achieve the stated objectives.

BRIEF DESCRIPTION OF THE DRAWINGS

In the drawings:

FIG. 2 depicts a chart of a mapping between IPA symbols and Klattese.

FIG. 12 depicts an example of probabilities for production patterns to canonical IVCs including reductions using consistency constraints.

DETAILED DESCRIPTION

Figure 1:
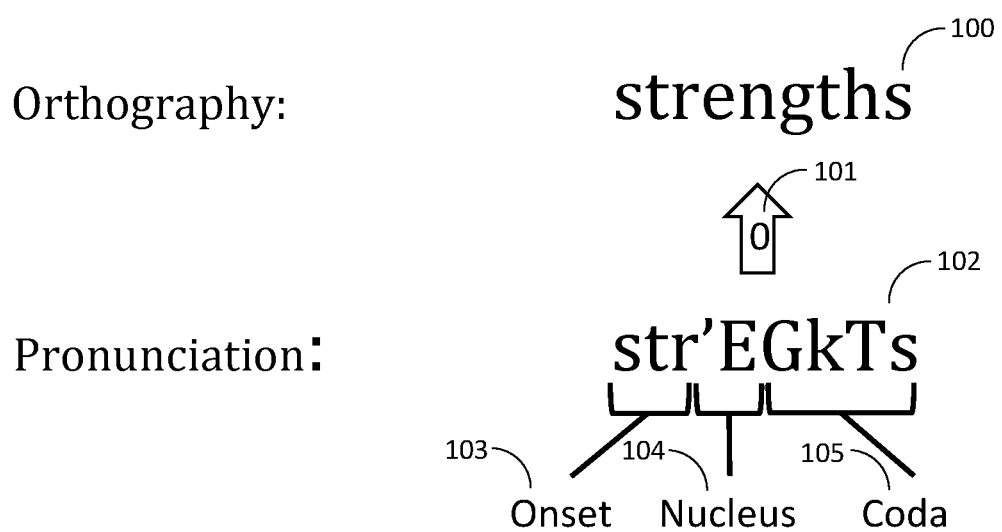
FIG. 1 depicts a syllable structure comprising an onset, nucleus, and coda.

In the following description, for the purposes of explanation, numerous specific details are set forth in order to provide a thorough understanding of the present disclosure. It will be apparent, however, that the embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. OVERVIEW OF EXAMPLE LANGUAGE PROCESSING SYSTEM
3. SYLLABLE STRUCTURE OVERVIEW
4. PHASES OF OPERATION
   4.1 TRAINING PHASE
      4.1.1 LEARNING PHONOTACTIC PATTERNS FROM THE PRONUNCIATION DICTIONARY
      4.1.2 LEARNING MAPPINGS FROM PRODUCTION PATTERNS TO CANONICAL PATTERNS
      4.1.3 LEARNING RELATIONSHIPS BETWEEN CANONICAL SYLLABLES AND ORTHOGRAPHIC PATTERNS
      4.1.4 LEARNING N-GRAM MODELS IN A SYLLABLE PRONUNCIATION SPACE 4.1.5 LEARNING N-GRAM MODELS IN THE SYLLABLE ORTHOGRAPHIC SPACE
4.1.6 LEARNING THRESHOLDS AND OVERRIDES
4.2 RECOGNITION PHASE
5. IMPLEMENTATION EXAMPLE
6. BENEFITS OF CERTAIN EMBODIMENTS
7. HARDWARE OVERVIEW

1. General Overview

In an embodiment, a method using syllables and certain other syllable-sized units of speech reflecting phonotactic rules and constraints to convert symbols representing an input stream of spoken phones and other nonspeech symbols (production stream), to a stream of canonical pronunciations (canonical stream) and then converting the canonical stream to an output of orthographic text (orthographic stream).

The method comprises of a training phase and a recognition phase. The training phase comprises utilizing a set of training materials (including a specially structured pronunciation dictionary and transcribed word and sentence corpora) to extract, from three streams (production, canonical and orthographic), quasi-closed sets of certain of a language's phonotactic units or patterns, including syllables and their components, InterVowel Consonant (IVC) phoneme sequences and Vowel Neighborhood (VN) phoneme sequences and syllable-sized orthographic units. Each set of these units or patterns is constrained by rules governing phoneme, syllable and word sequencing and segmentation. The process then associates or maps each of the units extracted from the production stream with all permissible canonical units and determines the conditional probabilities of each production-canonical association. Again utilizing the training materials, the process associates or maps the canonical units or patterns with permissible orthographic patterns and assigns conditional probabilities to each canonical-orthographic combination. In addition the training materials are used to generate n-gram models for both syllable pronunciation and orthography. Finally, the training learns and discards permissible but very low-probability syllables and generates expanded context tools to correct instances where the previous steps do not generate a satisfactory result.

The recognition phase comprises using the sets of linguistic units and the conditional probabilities of the three mapped streams learned in the training phase. Production IVCs and production VNs are extracted from the input acoustic symbol stream to create a production IVC and VN stream or queue. That stream is mapped to sets of canonical IVC and VN patterns with learned conditional probabilities to create a canonical IVC and VN stream or queue. The stream of canonical IVCs and VNs is cleansed of IVC and VN patterns inconsistent with the learned set of permissible IVCs and VNs and the conditional probabilities are renormalized. The canonical stream is then segmented into a set of candidate syllable coda-onset sequences from which a stream of candidate syllables is generated. Impermissible syllables, those not in the syllabary, are eliminated and normalized conditional probabilities are generated for the permissible candidates from the learned probabilities of the IVCs, VNs, codas and onsets. The candidate IVC patterns are then mapped to the learned associated orthographic pattern sets. Patterns which are inconsistent with learned syllable position constraints are eliminated and the resulting stream of permissible orthographic patterns is subjected to a sliding n-gram context model to generate path probabilities. The most likely orthographic pattern is emitted unless it is identified as a member of a learned expanded context override set, in which case the override is emitted.

2. Overview of Example Language Processing System

Figure 5A:
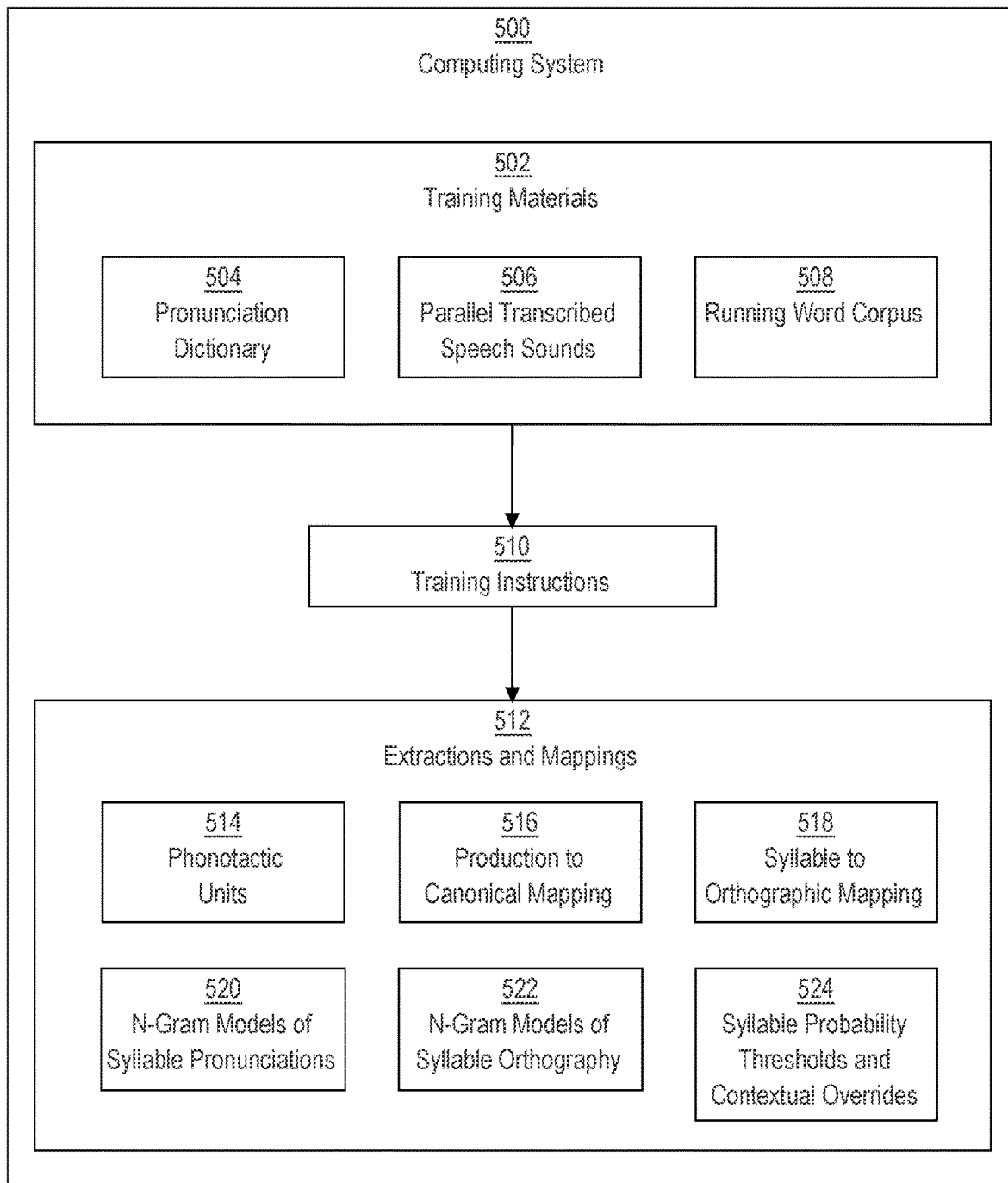
FIG. 5A depicts example training reference materials.

FIG. 5A depicts an example system for training mappings for converting streams of symbols representing speech and non-speech sounds to an output stream of orthographic patterns.

A computing system 500 may be implemented using a server-class computer or other computers having one or more processor cores, co-processors, or other computers. Computing system 500 may be physical server computers and/or virtual server instances stored in a data center, such as through cloud computing. Additionally or alternatively, computing system 500 may be a smart phone, personal computer, tablet computing device, PDA, laptop, or any other computing device capable of transmitting and receiving information and performing the functions described herein.

FIG. 5A depicts a single computing system 500 as a distinct element to illustrate a clear example. However, in other embodiments, more computing systems may be used to accomplish the functions described herein. For example, a first computing system may generate the extractions and mappings and sets of phonotactic units using the training materials 502 and send the mappings 512 to a second computing system. The second computing system may use the mappings 512 to generate orthographic patterns from streams of symbols. Additionally or alternatively, multiple computing systems may be used.

Computing system 500 comprises training materials 502. Training materials 502 comprise data used to generate extractions and mappings 512. In the embodiment of FIG. 5A, training materials 502 comprise a pronunciation dictionary 504, a corpus of parallel transcribed speech sounds 506, and a running word corpus 508. In other embodiments, more or less training materials may be used to generate extractions and mappings 512.

Pronunciation dictionary 504 comprises syllabified standard pronunciations and corresponding orthographic patterns of words of a particular language. While English is used as an example in the disclosure, the methods described herein may be used with any language.

Corpus of parallel transcribed speech sounds 506 comprises aligned production and canonical pronunciations of different sound streams in a particular language.

Running word corpus 508 comprises a concatenation of transcribed spoken or written phrases or sentences in a particular language.

All three of these tools may consist of proprietary materials or commercially available corpora or combinations thereof.

Training instructions 510 may comprise a set of one or more pages of main memory, such as RAM, in a computing system into which executable instructions have been loaded and which when executed cause the computing system to perform the functions or operations that are described herein with reference to those modules. For example, the training instructions may comprise a set of pages in RAM that contain instructions which when executed cause identifying each instance of a production pronunciation pattern and mapping that pattern to one or more canonical pronunciation patterns The instructions may be in machine executable code in the instruction set of a CPU, GPU, Phi or other processing chip and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, training instructions 510 also may represent one or more files or projects of source code that are digitally stored in a mass storage device such as non-volatile RAM or disk storage, in the systems of FIG. 5A or a separate repository system, which when compiled or interpreted generate executable instructions which when executed cause the computer to perform the functions or operations that are described herein with reference to those instructions. In other words, the drawing figures may represent the manner in which programmers or software developers organize and arrange source code for later compilation into an executable, or interpretation into bytecode or the equivalent, for execution by a computer.

In an embodiment, computing system 500 uses training instructions 510 to generate a variety of language processing values 512. These include phonotactic data sets learned from the pronunciation dictionary, including one or more of comprehensive sets of syllables (syllabary), syllable onsets, syllable codas, IVC patterns and VN patterns with associated conditional probabilities. They also include mappings of production IVC and VN patterns to canonical IVC and VN patterns 516 and Section 4.1.2, and canonical syllable to orthographic mapping 518. They also include learning n-gram models of syllable pronunciations 520, and n-gram models of syllable orthography 522. They also include learning syllable probability thresholds and contextual overrides 524 as described in Section 4.1.6.

The computing system 500 may be further programmed or configured to use the mappings to generate orthographic patterns from incoming production patterns. Additionally or alternatively, computing system 500 may be programmed or configured to send the mappings to a different computing device over a network. The network broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between computing system 500 and a second computing system. Computing system 500 and the second computing system may also have direct (wired or wireless) communications links. The computing system 500 may be programmed or configured to use standardized protocols for communication across the networks such as TCP/IP, Bluetooth, and higher-layer protocols such as HTTP, TLS, and the like.

3. Syllable Structure Overview

Speech is produced by changing the configuration of the articulators (i.e. the jaw, the tongue, the lips, etc.). Consonants are produced by forming a constriction somewhere along the vocal tract, whereas vowels are produced with a more open configuration. The alternation between constriction and openness induces modulation patterns on the speech signal, which along with certain other acoustical and phonotactic cues, leads to perceptual segmentation into syllables. The syllable is the basic temporal structuring unit of speech. With little training, children can count the number of syllables in an utterance, even with unfamiliar words, including "nonsense" words (e.g. "napkapity"). Syllable "beats" give speech its characteristic rhythm and allow the perceptual processes to focus on the confusable alternatives within each beat. Perceptual efficiency is further increased because the internal structure of syllables (i.e. phonotactics) locally constrains the sequences of phonemes which are acceptable in the language.

Phonotactic constraints also limit the potential segmentation points between syllables. Because word boundaries are a subset of syllable boundaries, constraints on syllable segmentations also constrain the word segmentations. Syllables contribute to speech perception in many other ways. For example, syllables are the carriers of lexical stress, and also carry the pitch pattern and temporal elongation cues used to discern questions from statements, detect phrase boundaries, etc.

Several aspects of the present disclosure exploit the structure of the syllable. FIG. 1 shows the structure of the single syllable word "strengths". As shown in FIG. 1, the syllable comprises three parts—the "onset" 103, the "nucleus" 104, and the "coda" 105. The onset 103 is a sequence of zero or more consonants before the nucleus. The nucleus 104 is a single vowel-like sound. The coda 105 is a sequence of zero or more consonants after the nucleus. In FIG. 1, and throughout the disclosure, pronunciations 102 are represented in "Klattese".

Mappings from IPA symbols to Klattese is shown in FIG. 2. This representation is used for convenience and computational simplicity. Any other symbolic representation of pronunciations, such as patterns of articulatory features, or patterns of auditory features could be used if phonotactic rules governing syllables can be defined in terms of those symbolic patterns. As can be seen in FIG. 2, the phoneme symbols can be classified as consonants 200 or nuclei 201.

Figure 3:
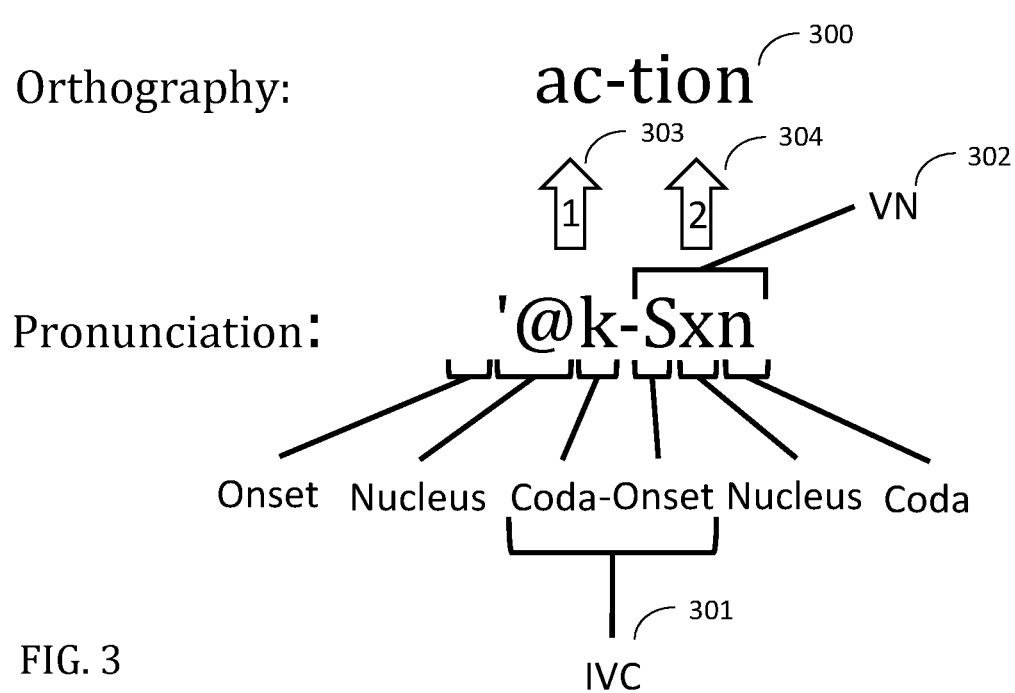
FIG. 3 depicts a structure of a multi-syllable word.

Each language has a set of phonotactic rules which restrict the sequences of symbols which may occur in an onset, or in a coda, or in the whole syllable. In English, for example, /str/ is acceptable as an onset but not as a coda. Likewise, /GkTs/ is acceptable as a coda but not as an onset. In multiple syllable words and in sequences of spoken words, the coda of one syllable is followed by the onset of the next. FIG. 3 illustrates this with the two-syllable word "action". We refer to the symbol pattern in the coda-onset sequence as an IVC 301 pattern. Syllable boundaries within an IVC pattern can only occur where the split of the IVC pattern results in a valid coda pattern and a valid onset pattern.

Referring to FIG. 3, the IVC pattern 301 /kS/ potentially could be segmented /-kS/, /k-S/, or /kS-/. However, because /kS/ is not a valid coda nor is it a valid onset, the only valid segmentation is /k-S/. For some IVC patterns there is more than one valid segmentation into a coda-onset sequence. In such cases, when syllabifying dictionary pronunciations, an embodiment comprises using the "maximum onset principle" (MOP) which segments the IVC such that the longest of the valid onset possibilities is selected. For example, the word "modal" could be segmented into mo-dal or mod-al. MOP requires the former segmentation. Any other consistent method, such as the "maximum coda principle" (MCP) may be used. Whatever method is used, the result will be a common set of IVCs of varying lengths. In addition, the complexity of onsets and codas varies among languages. Therefore the maximum number of IVCs and the number of consonants in IVCs will also vary in length depending on the language and the extent to which the relevant dictionary incorporates words from more than one language.

A VN 302 pattern, comprises the phoneme preceding the syllable nucleus, the nucleus, and the phoneme following the nucleus. For syllables having null onsets and/or codas, the first and/or last symbol in the VN may refer to a break in speech or to a speech sound from an adjacent syllable.

Exploiting syllable structure provides several advantages. The syllable, and its internal structures provide local deterministic constraints on acceptable sound patterns (e.g. IVC patterns must comprise a valid coda-onset sequence, the first IVC in an utterance must be a valid onset, etc.). Hypothesized patterns which are not consistent with these constraints can be trivially eliminated from further processing which at recognition time greatly reduces the number of required computations and increases the probabilities of the valid patterns.

The sets of acceptable coda and onset patterns significantly constrain the feasible syllable segmentation points. This allows competing hypothesized syllables to form a temporally aligned set. Normal speaking rates generate less than 8 syllables per second allowing the processing steps synchronized with the arrival of each syllable "beat" to be applied at a low rate as well. When learned from a sufficiently large, appropriately prepared pronunciation dictionary, the onsets, codas, syllables, IVC patterns, and VN patterns form quasi-closed sets. It is rare for the phonotactic rules of a language to change. Thus, the out-of-vocabulary problem is greatly reduced when based on syllable-related units. Many pronunciation variations are systematic changes which occur within the IVC patterns near word edges, or in the VN patterns in the central portion of syllables. By learning the systematic changes, candidate canonical forms can be recovered from the modified production forms.

Each syllable's pronunciation is associated with one or more orthographic patterns. As shown in FIG. 1, the orthographic pattern "strengths" 100 is associated with the syllable's pronunciation /str'EGkTs/ 102. Some syllables such as /str'EGkTs/ have only one associated orthographic pattern. Others have multiple associated orthographic patterns. For example, /D'Er/ is associated with orthographic patterns "there", "their", and "they're". The associated orthographic pattern for a given syllable is often influenced by the syllable's position in a word. For example, the orthographic mapping of /D'Er/ as "they're" only occurs when /D'Er/ represents a single syllable word, whereas the orthographic mapping "there" can be correct for a single syllable word, or as the first syllable of a multiple syllable word, e.g., "therefore".

To capture the influence of the syllable's position on orthographic mappings, the pronunciation dictionary includes a code determined by the syllable position. The observed association is coded '0' for single syllable words, '1' for the first syllable in a multiple syllable word, and '2' for subsequent syllables in a multiple syllable word. In FIG. 1, the position code 101 of '0' indicates the association of "strengths" with the syllable /str'EGkTs/ occurs in a single syllable word. In FIG. 3, the position code 301 of '1' indicates the association of the orthographic pattern "ac" with the syllable /'@k/ occurs in the first syllable of a multiple syllable word, the position code 302 of '2' indicates the association of the orthographic pattern "tion" with the syllable /Sxn/ occurs in other than the first syllable of multiple syllable words.

Using syllable-clocked processing permits contextual modeling and constraints to be applied to the same units in both the acoustical and orthographic views providing complementary disambiguation.

4. Phases of Operation

Figure 4:
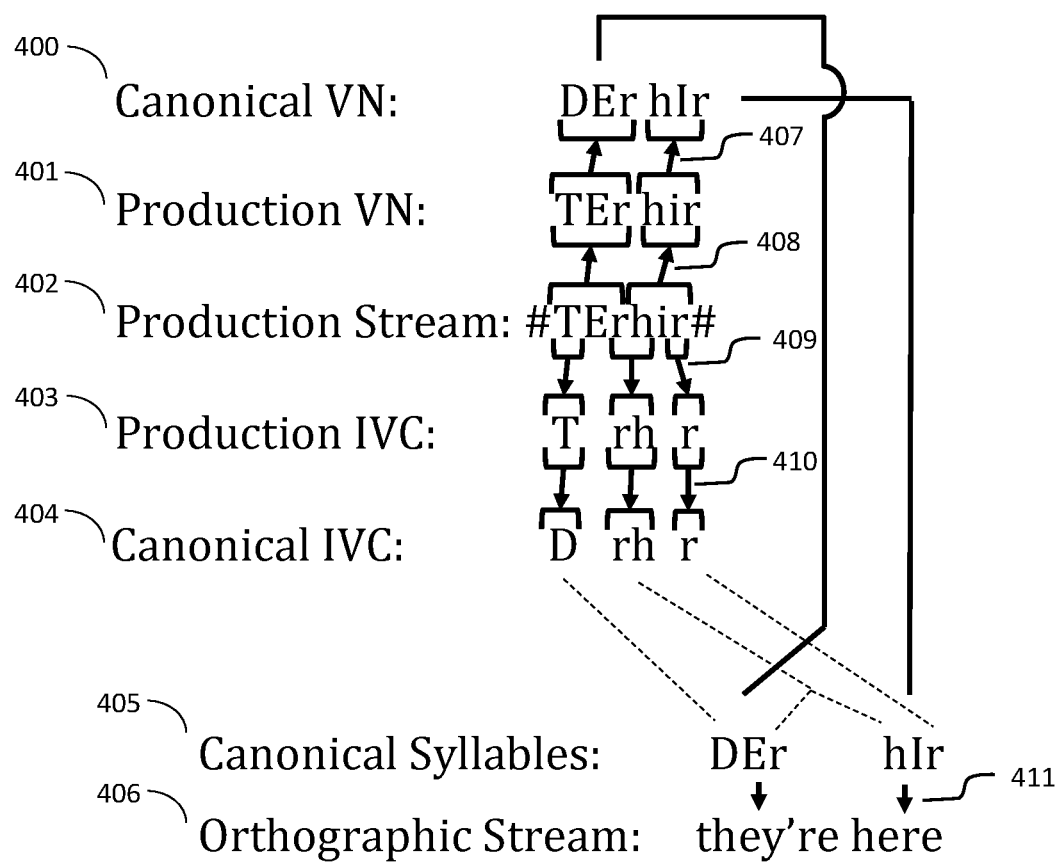
FIG. 4 depicts relationships of various streams.

Embodiments of the disclosure are separated into two phases—training and recognition. Both phases operate on a cascade of three symbol streams—production, canonical and orthographic. FIG. 4 shows the relationships between the streams. The first stream is the production 402 stream which is the initial input at both the training and recognition phases. The production stream is a symbolic representation of the input sound sequence as produced by the speaker, and as converted to symbolic form by automatic processing of the acoustical signal. The input stream is segmented into production IVC 403 patterns and VN 401 patterns.

Mappings learned in the training phase are used in the recognition phase to convert each production IVC 403 and VN 401 pattern to corresponding sets of canonical IVC 404 and VN patterns 400 with associated conditional probabilities. These canonical IVC and VN patterns are in turn mapped to canonical syllables 405 which are then mapped to the orthographic stream 406. Note that in FIG. 4, for clarity, the sets of mapped patterns are represented by a single member of the sets.

4.1 Training Phase

Figure 5B:
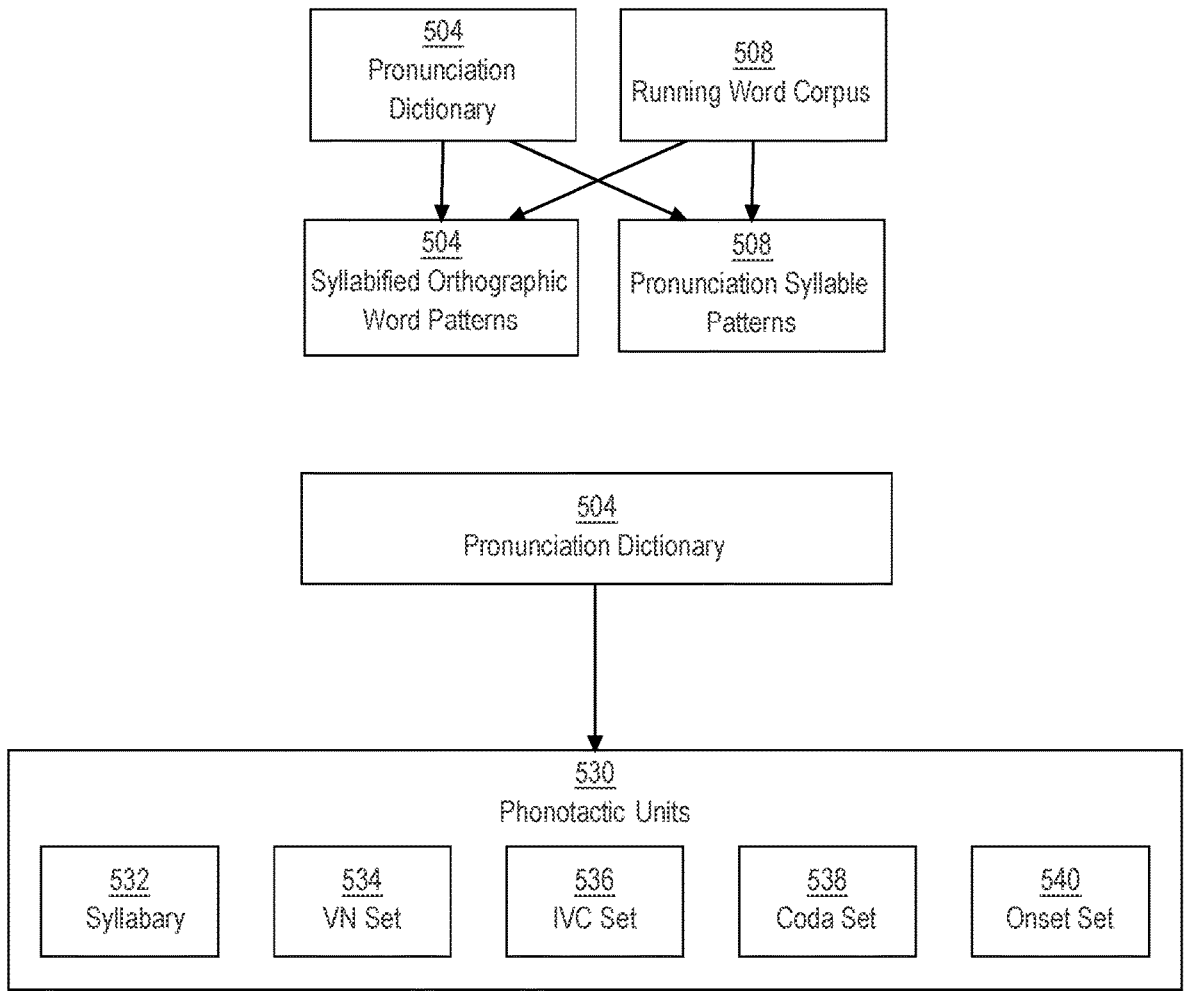
FIG. 5B depicts example training reference materials.

In training phase, the system learns the allowable patterns of onsets, codas, syllables, IVCs, and VNs, and the associations of each such pattern in the production stream and a set of one or more corresponding patterns in the canonical space. In addition, a set of associated orthographic patterns is learned for each canonical syllable and a conditional probability is assigned to each such associated pattern. N-gram contextual models based on syllable units are also learned, based on both syllable pronunciations and syllable orthographic patterns. The various sets of allowable patterns and the n-gram models are learned by referencing training material. As shown in FIG. 5A, the training material comprises a pronunciation dictionary 504, a corpus of parallel transcribed speech sound streams 506, and a large corpus of running words 508. As shown in FIG. 5B, the pronunciation dictionary 504 is the source of sets of phonotactic units 530, including the syllabary 532, the set of VNs 534, the set of IVCs 536, the set of syllable codas 538 and the set of syllable onsets 540. The pronunciation dictionary 504 is also applied to the running word corpus 508 to generate the syllabified orthographic word corpus 526 and the pronunciation syllable corpus 528.

The body of words comprising the pronunciation dictionary 504 is obtained initially from one or more publicly available or proprietary corpora of words.

When preparing the pronunciations for each of these words for American English, the pronunciations are intended to represent the "Standard American" pronunciation for the word as carefully spoken in isolation. In addition to the canonical pronunciation, alternate pronunciations may also be included in the dictionary for common pronunciations of the word which either change the number of syllables (e.g. /pr'abli/ for "probably") and/or introduce additional codas and/or onsets (e.g. /'@dmrxl/ for "admiral" introduces /mr/ which is not a normal onset in English). In addition to including frequently occurring words, special efforts are made to include all single-syllable words, words which are examples of valid phonotactic patterns which would not otherwise be represented, and words which introduce novel syllable orthographic patterns.

Some words have more than one "correct" spelling (e.g. "ameba" or "amoeba"); however, for most applications it is desirable to standardize spelling. Therefore, for each word in the dictionary, a single orthographic pattern is selected as "standard", and all others are considered "alternate spellings". For words, such as proper nouns and proper adjectives, which require capitalization, the capitalization is included in the standard spelling.

After the pronunciations are syllabified using the maximum onset principle, the standard orthography is syllabified by assigning orthographic sequences to the pronounced syllables such that the segmentations keep the closest correspondence to the pronounced syllables. This differs from common dictionary orthographic syllabification in some cases. For example, "passion" /p'@-Sxn/ is syllabified "pa-ssion" instead of the "pas-sion" typically found in dictionaries. The word "mission" /m'I-Sxn/ is likewise syllabified "mi-ssion" instead of "mission". This unusual method of orthographic syllabification makes it clear that the syllable /Sxn/ is associated with the orthographic pattern "ssion" in many words.

When the dictionary entry is a hyphenated compound word, the hyphen symbol may become part of the orthography of the last syllable of the first part of the compound. For example, in the compound "Anglo-American", the syllable /glo/ is associated with the orthographic pattern "glo-" with a position code of '2'. In hyphenated words, the position code for the syllable following the hyphen is set to '0' if only 1 syllable follows the hyphen or '1' if more than one syllable follows the hyphen.

It should be noted that the dictionary may contain some words which are foreign in origin (e.g. "schmuck") and non-English names. Therefore, the learned phonotactic rules are not strictly limited to those defined for "pure" English. Further, while the system is described using examples for English, the approach could be applied to processing other languages by using reference dictionaries for those languages.

4.1.1 Learning Phonotactic Patterns from the Pronunciation Dictionary

Figure 6:
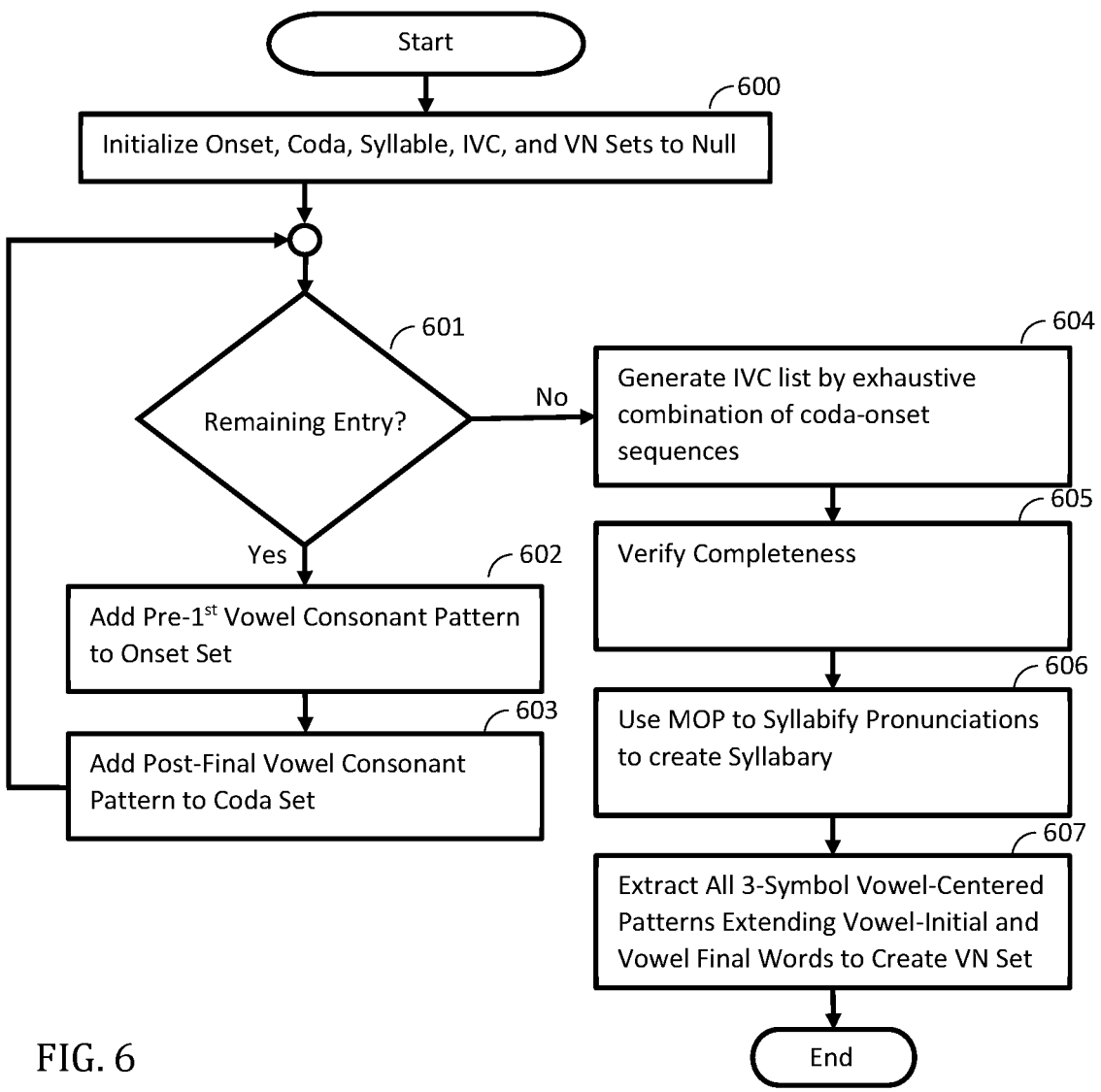
FIG. 6 is a flowchart depicting an example method of learning phonotactic patterns from a pronunciation dictionary.

The sets of onsets, codas, syllables (i.e. the "syllabary"), IVC patterns, and VN patterns are learned by referencing the pronunciation dictionary 504. Each word in the dictionary has a canonical pronunciation, and may also have alternate pronunciations. FIG. 6 is a flowchart depicting an example method of learning phonotactic patterns from a pronunciation dictionary. Referring to FIG. 6, the sets of onsets, codas, syllables, IVC patterns and VN patterns are set to null 600. For each pronunciation in the production dictionary, the sequence of consonants before the first vowel is added to the set of onsets 602, the sequence of consonants after the last vowel is added to the set of codas. When there are no more unprocessed entries in the dictionary, the set of IVC patterns is generated by sequencing each coda with each onset 604.

Because it is possible that some codas and/or onsets only occur word-internally, the generated set of IVC patterns is checked against the word-internal IVC patterns in the pronunciation dictionary. If any word-interval IVC patterns are found which are not in the set, the previously unknown codas and/or onsets are added to their respective sets and the IVC pattern set is regenerated 605.

In step 606, the maximum onset principle (MOP) is used to segment each pronunciation into syllables and add the syllables to the syllabary. At step 607, for every vowel in the pronunciation of every word in the dictionary, the VN patterns are extracted. The VN pattern consists of the three-symbol sequence, the symbol before the nucleus, the nucleus, and the symbol following the nucleus. If the nucleus is the first symbol in the pronunciation, the VN pattern is extended by adding the break symbol "#" in the first position of the VN.

Additional VN patterns are generated when the nucleus is the first symbol by iteratively adding the last symbol of every word's pronunciation in the first position of the VN. Similarly, if the nucleus is the last symbol of a word's pronunciation, the VN is extended by adding the break symbol "#" in the last position of the VN, and additional VN patterns are generated by iteratively adding the first symbol of every word's pronunciation to the last position of the VN. The generation of additional VN patterns when the nucleus is in the first or last position of the pronunciation is necessary because the VN may span multiple syllables or words when the onset and or coda patterns contain no consonants. Generated in this manner, the VN patterns account for all possible sequences of words.

4.1.2 Learning Mappings from Production Patterns to Canonical Patterns

The pronunciations of words as spoken often differ from the canonical. Many of the differences occur near the edges of syllables (i.e. within the IVC pattern). For example, in the utterance "Did you see her?", the first two words may be spoken /dIJu/ instead of the canonical /dIdyu/. The substitution of /J/ for /dy/ is a systematic result of the articulatory configurations involved. Other differences occur due to the influence of context on the central portion of syllables.

One aspect of the disclosure is to learn mappings between each production IVC or VN pattern and a corresponding set of likely canonical IVC or VN target patterns. This is done by reference to training material comprising aligned production and canonical speech sound streams 506. Each observation of a production IVC or VN pattern with a corresponding canonical IVC or VN pattern is counted. From the association counts, conditional probabilities of each canonical pattern given the observed pattern are estimated.

Figure 7:
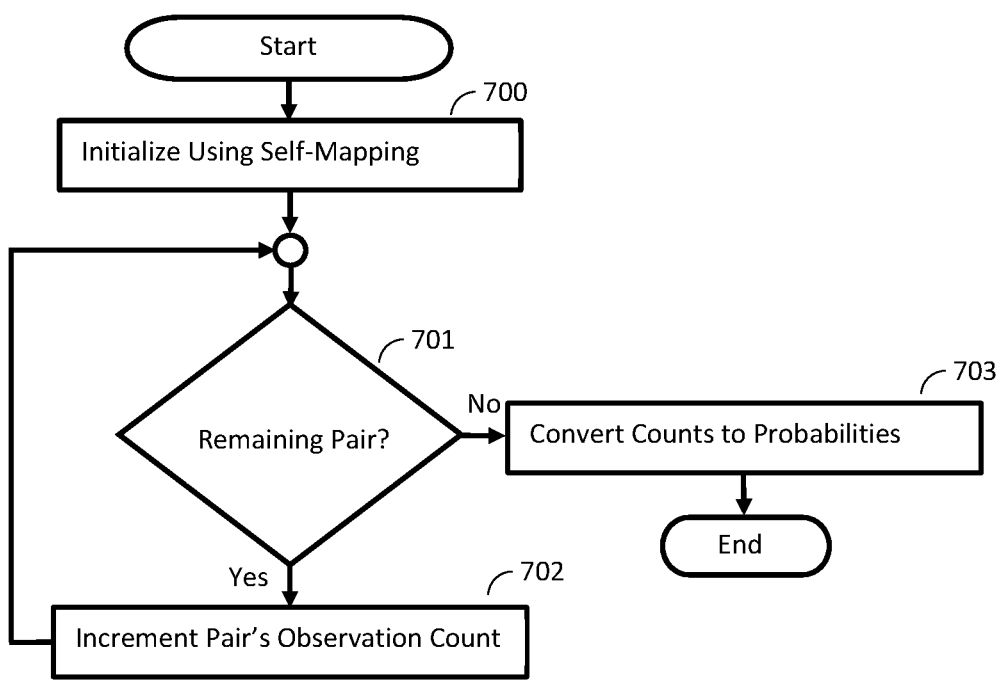
FIG. 7 is a flowchart depicting an example method of learning mappings from production patterns to canonical patterns.

FIG. 7 is a flowchart depicting an example method of learning mappings from production patterns to canonical patterns. FIG. 7 additionally shows the process of learning the conditional probability mappings from production to canonical patterns. It is known that every IVC or VN pattern can be produced canonically, even if examples of such patterns do not exist in the training material. Therefore, in step 700, the set of production patterns is initialized to include each member of the set of the canonical patterns. The association count of each production pattern paired with its corresponding canonical pattern is initialized to 1.

Next 701, while remaining IVC or VN patterns are identified in the production stream, the corresponding IVC or VN pattern is identified in the canonical stream. In 702, for each pair of observed production and canonical patterns the association counts are incremented. In step 703, smoothed conditional probability estimates for each pair are computed as follows:

Let A be the number of observations of the production pattern;

Let B be the number of times the target pattern was associated with the production pattern;

Let C be the number of different target patterns associated with the production pattern.

$$\text{prob(target pattern | production pattern)} = \frac{B}{(A+C)} \qquad \text{eq. 1}$$

Other smoothing techniques could also be used such as:

$$\text{prob(target pattern | production pattern)} = \frac{B+1}{A+2} \qquad \text{eq. 2}$$

4.1.3 Learning Relationships Between Syllables and Orthographic Patterns

Figure 8:
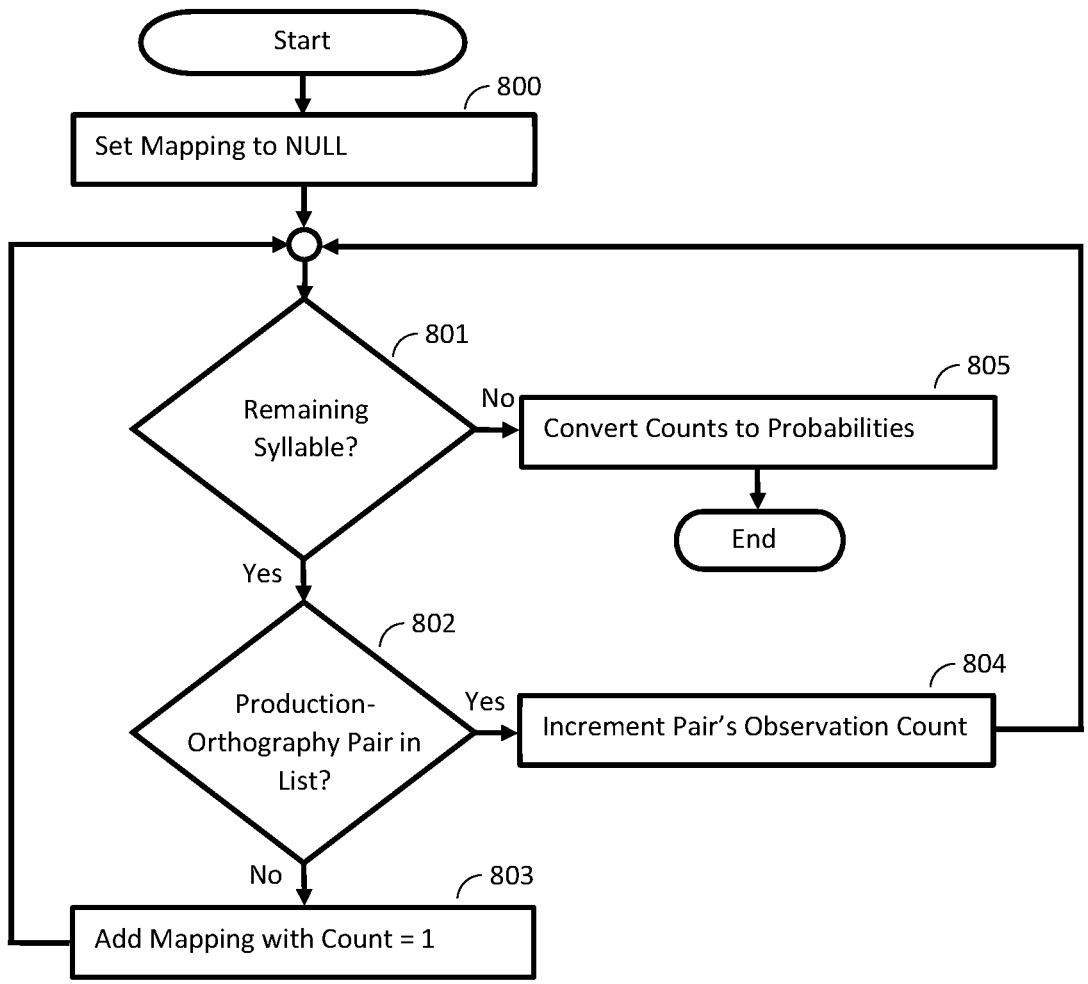
FIG. 8 is a flowchart depicting an example method of learning mappings from candidate syllables to orthographic patterns.

As previously explained, the pronunciation dictionary 504, contains syllabified pronunciations and corresponding orthographic patterns. FIG. 8 is a flowchart depicting an example method of learning mappings from candidate syllables to orthographic patterns. FIG. 8 additionally shows the process used to learn the conditional probabilities of each orthographic pattern given a syllable's position in the word. After initializing the mapping to null 800, while there are remaining unprocessed entries 801, each syllable-orthographic pair in each pronunciation in the pronunciation dictionary is examined to see if has already been added to the mapping list 802. If so, its association count is incremented and processing continues at 801. Otherwise, the new pair is added with an association count of 1 803, and processing continues at 801. In 804, when there are no more entries left to process, the association counts are used to compute conditional probabilities as follows:

Let A be the number of observations of the syllable pronunciation;
Let B be the number of times the orthographic pattern was associated with the syllable pronunciation;
Let C be the number of different orthographic patterns associated with the syllable pronunciation.

$$\text{prob(orthographic pattern | production pattern)} = \frac{B}{(A+C)} \qquad \text{eq. 3}$$

Other smoothing techniques could also be used such as:

$$\text{prob(orthographic pattern | production pattern)} = \frac{B+1}{A+2} \qquad \text{eq. 4}$$

4.1.4 Learning N-Gram Models in a Syllable Pronunciation Space

The contextual influence of neighboring syllable pronunciation is captured by training n-gram models of syllable pronunciations. In an embodiment, 3-gram models are trained. These models are trained using a large corpus of running words, a concatenation of sentences or phrases taken from transcribed speech or written texts. The running word corpus is converted to a pronunciation syllable corpus by using the pronunciation dictionary to retrieve the syllabified pronunciations of each word, including both the standard and any alternative pronunciations. Each sequence of n syllables represents an n-gram; in this embodiment each sequence of three syllables represents a 3-gram. Then, association counts are accumulated for each 3-gram pattern. After the counts are accumulated they are converted to probabilities using smoothing techniques similar to those used to compute the conditional probabilities for production to canonical patterns.

4.1.5 Learning N-Gram Models in the Syllable Orthographic Space

The contextual influence of neighboring syllable orthography is also captured by training n-gram models. In an embodiment, 3-gram models are trained. These models are trained using a large corpus of running words. The running word corpus is converted to a syllabified orthographic chunk corpus by using the pronunciation dictionary to retrieve the syllabified orthography of each word. Then, association counts are accumulated for each n-gram pattern. After the counts are accumulated they are converted to probabilities using smoothing techniques similar to those used to compute the conditional probabilities for production to canonical patterns.

4.1.6 Learning Thresholds and Overrides

As candidate syllables are constructed and assigned probabilities, some have very low probabilities. So low, in fact, that after being mapped to orthographic patterns, these syllables are never selected. After training, the system is tested and, the probability threshold is determined below which a particular syllable is never involved in the emitted output. This threshold is recorded and used at recognition time to eliminate candidates which do not influence the output.

Most ambiguity can be resolved locally. Some ambiguity can be resolved by expanding the context. Some ambiguity cannot be resolved by expanding context. Instead of blindly using large n-grams to improve results, larger n-gram patterns are generated only when the shorter ones fail.

During learning, when the "most likely" orthographic pattern does not match the target pattern, the system generates an "override". This records the "mistake" as a "key" and then identifies an expanded context (up to a specified maximum number of syllables or words) which would correct the mistake. If such an expanded context is found, the mistake key and the associated context and correct orthographic pattern is recorded. This mechanism can also be employed after system deployment to allow feedback to be used to improve system outputs.

4.2 Recognition Phase

Figure 9:
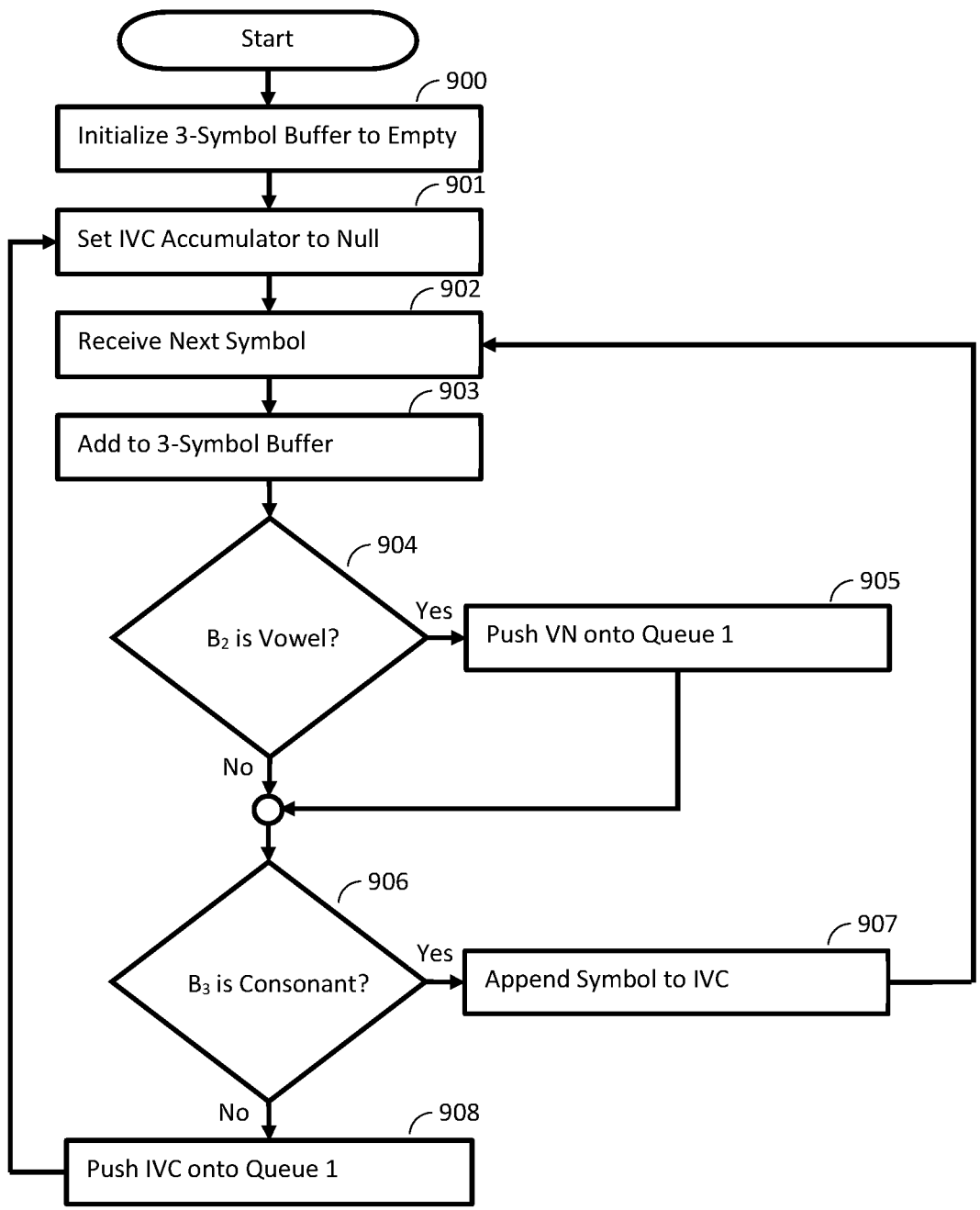
FIG. 9 is a flowchart depicting an example method of extracting IVC patterns and VN patterns from a production stream.

FIG. 9 is a flowchart depicting an example method of extracting IVC patterns and VN patterns from a production stream. During recognition, the incoming production symbol stream 402 is processed to extract production IVC 403 and VN 401 patterns and map them to the canonical IVC 404 and VN 400 respectively using the process shown in FIG. 9. The extraction process maintains a 3-Symbol buffer containing the just received symbol (B3), the symbol received just before that (B2), and the symbol received just before that (B1). An IVC accumulator buffer is also maintained.

Before any production symbols are received the 3-Symbol buffer is initialized to empty 900. The IVC accumulator is then set to Null 901. The next symbol is received 902 and becomes B3 in the 3-Symbol buffer 903. The 3-Symbol buffer is then examined to see if it contains a VN pattern 904. If so, the VN pattern is pushed onto Queue 1 905. The received symbol B3 is checked to see if it is a consonant 906. If so, it is appended to the IVC accumulator 907 and processing continues with receiving the next production symbol 902. Otherwise, the accumulated IVC (which may be null) is pushed onto Queue 1 908 and processing continues with receiving the next production symbol 902.

Figure 10:
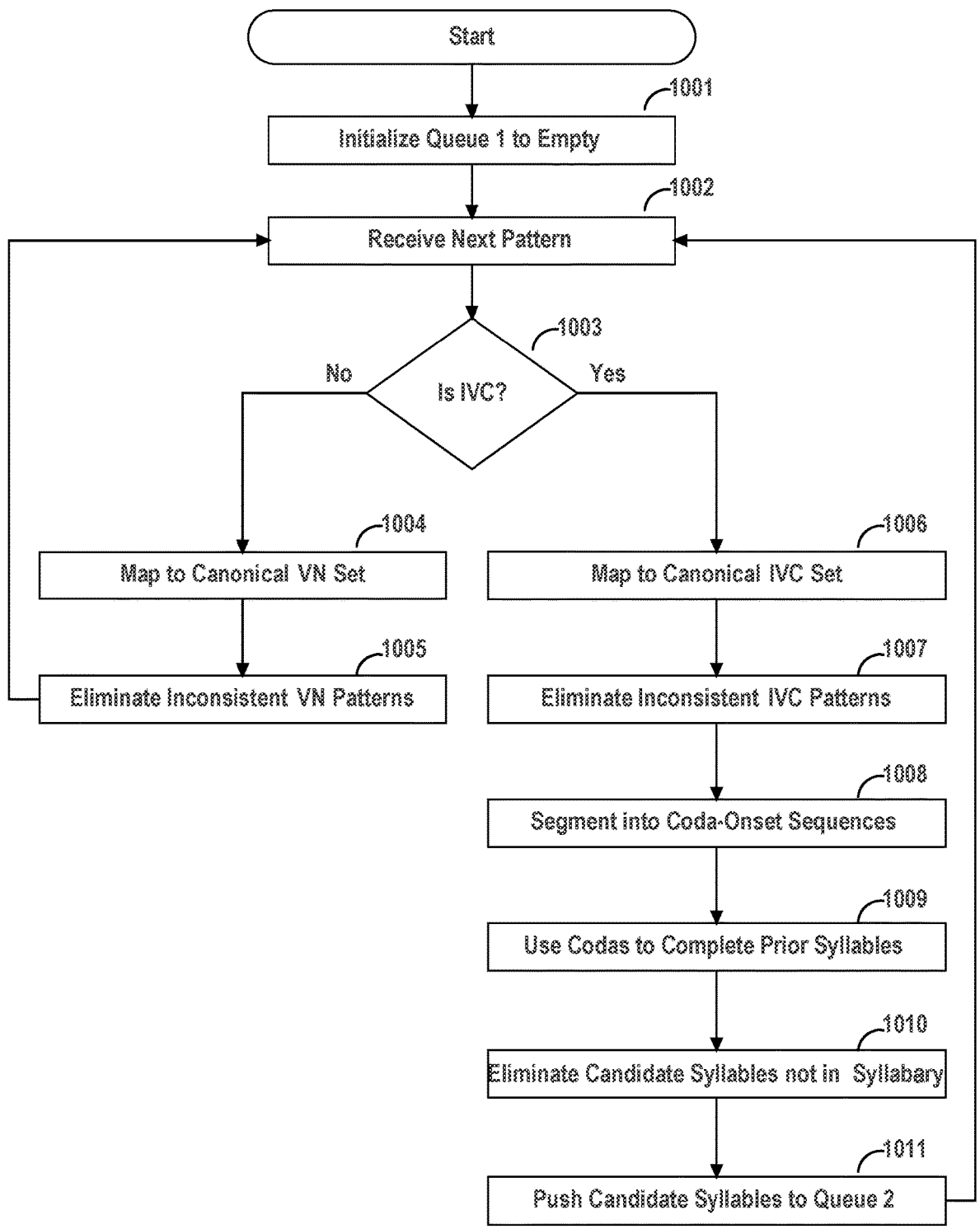
FIG. 10 is a flowchart depicting an example method of generating candidate syllable sets from canonical pattern sets.

FIG. 10 is a flowchart depicting an example method of generating candidate syllable sets from canonical pattern sets. The IVC and VN patterns in Queue 1 are processed as they arrive as shown in FIG. 10. Before processing begins the queue is initialized to empty 1001. The next pattern is received 1002 and processed based on whether it is an IVC pattern or not 1003. If it is a production VN pattern, it is mapped to a set of canonical VN patterns 1004. To be valid, the canonical VN patterns must form a consistent continuation of some member of the previous set of canonical IVC patterns 1005. Inconsistent VN patterns are eliminated from further processing. If the just received pattern is a production IVC pattern, it is mapped to a set of canonical IVC patterns 1006. To be valid, the canonical IVC patterns must form a consistent continuation of some member of the previous set of canonical VN patterns. Inconsistent IVC patterns are removed from further consideration 1007. Any VN patterns which do not have a consistent continuation to a member of the remaining IVC patterns are also eliminated.

Figure 11:
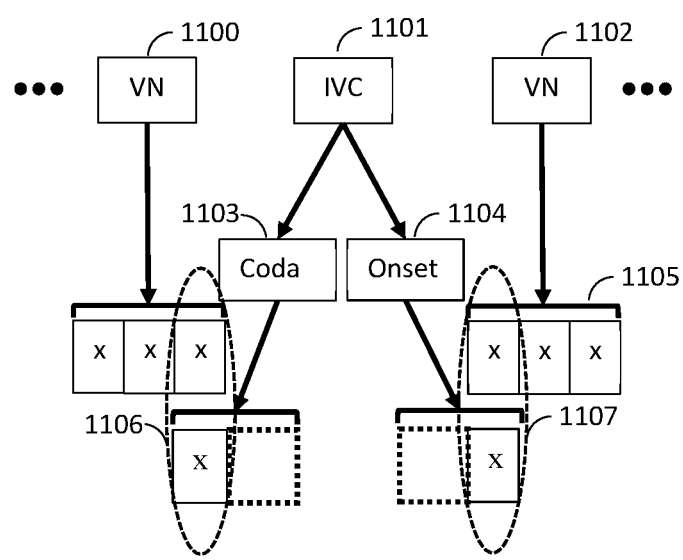
FIG. 11 depicts a diagram of application of consistency constraints.

FIG. 11 shows details of the application of path consistency constraints. 1100, 1101, and 1102 show the alternating arrival of VN and IVC patterns in Queue 1. Valid candidate mappings of the VN and IVC patterns form consistent paths through the arriving patterns. To be valid, an arriving IVC pattern 1101, must be consistent with one or more members of the remaining set of VN patterns 1100 which arrived just before the IVC pattern. The consistency of a continuing path between a VN pattern 1100 and an IVC pattern 1101 is determined by examinations of the "overlapped" portions of the patterns 1106. Specifically, the final symbol of the VN pattern 1100 is a break symbol, a vowel symbol, or a consonant symbol. If it is a break symbol or a vowel, valid IVC continuations are constrained to those with null coda patterns. If it is a consonant, valid IVC pattern continuations are constrained to those which start with that same consonant.

VN patterns for which there are no valid continuations are eliminated. Likewise, IVC patterns which are not valid continuations of at least one remaining VN pattern are eliminated. When a VN pattern arrives in Queue 1, to be retained it must form a valid continuation of one or more of the remaining members of the previous set of candidate IVC patterns. Similar to what has just been described, the consistency constraints are applied by examination of edge symbols of the IVC and VN patterns 1107, only this time the matching involves the last symbol of the IVC and the first symbol of the VN. If the first symbol of the VN is a consonant it must match the last symbol of at least one IVC to be valid. Otherwise, it can only be a continuation of an IVC with a null onset pattern.

Referring again to FIG. 10, as consistent IVC patterns are segmented into Coda-Onset sequences 1008, the coda portions are used to complete consistent paths through onsets segmented from the remaining previous IVC patterns and the remaining previous VN patterns. Each consistent path forms a candidate syllable 1009. If the candidate syllable is not in the syllabary, it is eliminated 1010. Permissible candidate syllables are pushed to Queue 2 1011. The pattern mappings 1004 and 1006 provide conditional probability estimates of each canonical pattern mapping given the production pattern. As IVC patterns are segmented into coda-onset sequences, these constituents of the IVC pattern inherit the probability of the IVC pattern. If multiple remaining IVC pattern segmentations result in the same coda or same onset pattern, the probabilities for the shared patterns are estimated as the sum of the probabilities of the IVC patterns which include them. The probabilities for the sets of onsets, codas, and VN are each normalized to sum to one. As syllable candidates 405 are formed they are assigned a probability computed as the product of the probabilities of their onset pattern, the VN pattern, and their coda pattern. The probabilities of the set of syllable candidates are then normalized to sum to one. The probabilities assigned to the syllable candidates are then further adjusted by applying n-gram contextual models.

FIG. 12 shows an example of how the application of the consistency constraints simplifies the recognition of IVCs. The example is of the single phoneme production IVC /T/. The training process generated 58 different canonical IVCs associated with the production IVC /T/ 1200 with a wide range of conditional probabilities 1201. After application of the consistency constraints, the set of possible canonical IVC patterns is reduced to a far more compact number of 14 1202, a roughly 76% reduction. The associated conditional probabilities 1203 of the remaining IVC patterns are then normalized to sum to one.

Figure 13:
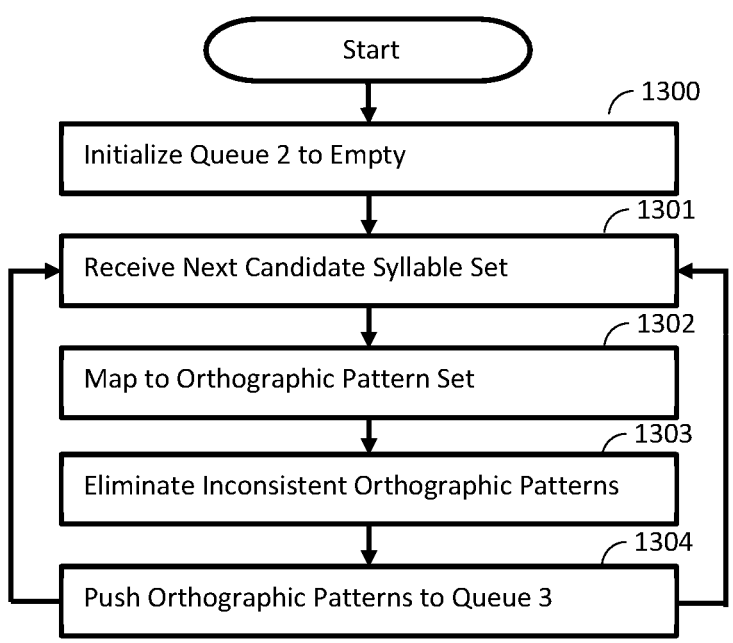
FIG. 13 is a flowchart depicting an example method of mapping candidate syllables to orthographic patterns.

Next the set of orthographic patterns 406 associated with each of the candidate syllables 405 is generated. FIG. 13 is a flowchart depicting an example method of mapping candidate syllables to orthographic patterns. In FIG. 13, Queue 2 is initialized to empty 1300. A candidate syllable set is received in Queue 2 1301 and mapped to an orthographic pattern set 1302. The positional codes 101, 303, and 304 associated with the patterns are used to eliminate invalid patterns 1303. The remaining mapped patterns are pushed to Queue 3 1304.

Figure 14:
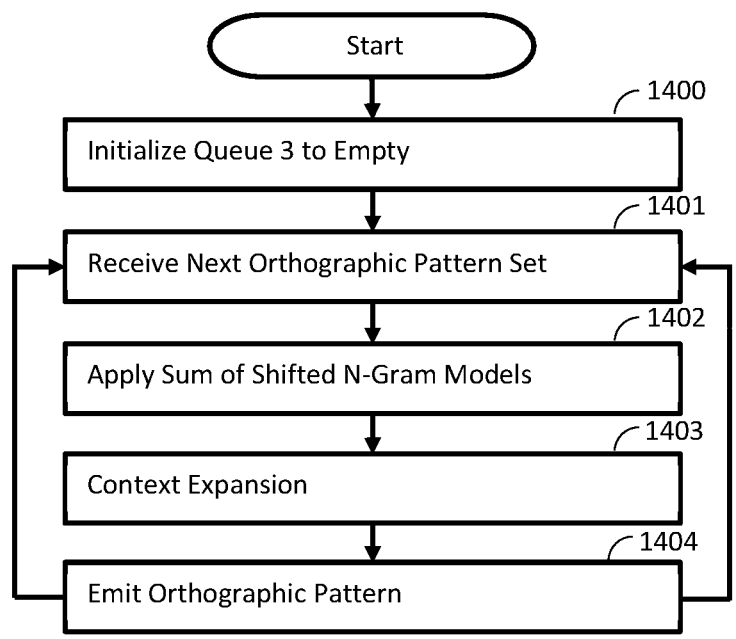
FIG. 14 is a flowchart depicting an example method of application of position constraints and statistical models to select output orthographic patterns.

FIG. 14 illustrates a process of applying syllable position constraints and statistical models to select output orthographic patterns. Queue 3 is used to process sets of syllable-associated orthographic chunks in context. It may be viewed as a sliding window containing a history of the 'N' most recent candidate sets of syllable orthographic patterns. The conditional probabilities of the patterns and their contextual probabilities are used to identify the most likely pattern to emit at the "oldest" end of the sliding window.

In an embodiment, the size of the sliding window is set to 7 syllables. Other embodiments could use differ lengths with different trade-offs between context and latency. Queue 3 is initialized to empty 1400. The next orthographic pattern set is received 1401. Shifted n-gram context models are used to generate path probabilities. The sum of the shifted n-gram models is then applied 1402. If the about-to-be emitted pattern is found as a key in the override set, and the context is consistent with an override, the emission pattern associated with the override is emitted; otherwise the "most likely" pattern is emitted 1403.

Figure 15:
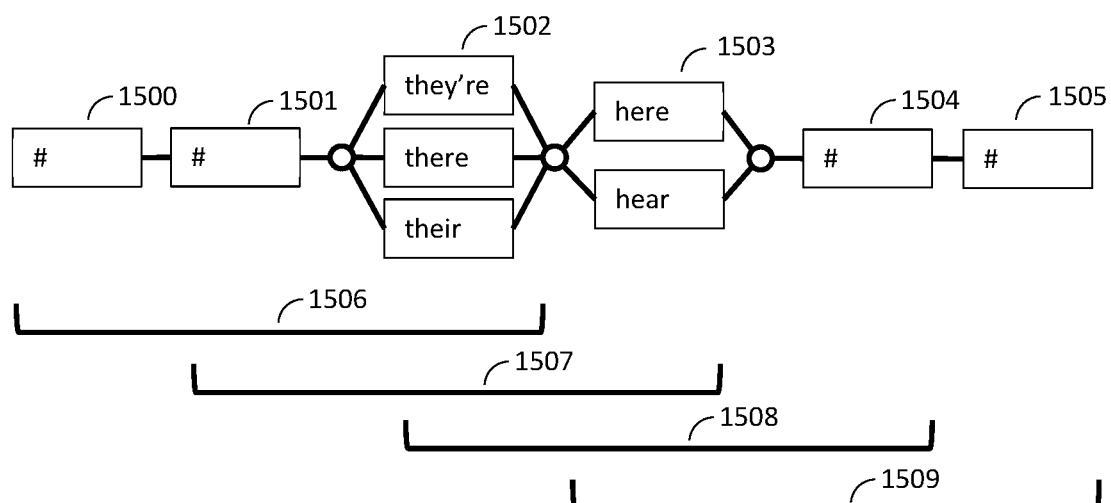
FIG. 15 depicts a confusion network of orthographic candidates.

FIG. 15 is an example of a confusion network of orthographic candidates. After 3 syllable-clock periods, 3-Gram models 1506 are applied to patterns at syllable-clock periods 1500, 1501, and 1502. Upon the arrival of the orthographic candidates at syllable-clock period 1503, 3-Gram models 1507 are applied to the patterns at syllable-clock periods 1501, 1502, and 1503. As each new set of orthographic patterns arrives 1504, and 1505 3-Gram models, 1508 and 1509 respectively are applied.

In some situations, it may be that the acoustical recognizer that generates the production stream may not be able to identify the specific phoneme class with high confidence. In such cases, the symbols in the stream may represent broad phonetic classes. If this occurs, sets of canonical patterns are the union of the sets generated by repeating the mapping by substituting the symbols representing each of the specific classes which are members of the broad class. For example, if the acoustical processor could not determine with confidence whether the phoneme segment was an /m/ or an /n/ it would insert a symbol representing the broad class {/m/, /n/} into the production stream. The mapping from production to canonical would, in turn, substitute /m/ and /n/ into the IVC in place of the broad class symbol and for the set of mapped canonical IVC patterns as the union of the separate mappings.

5. Implementation Example

Figure 16:
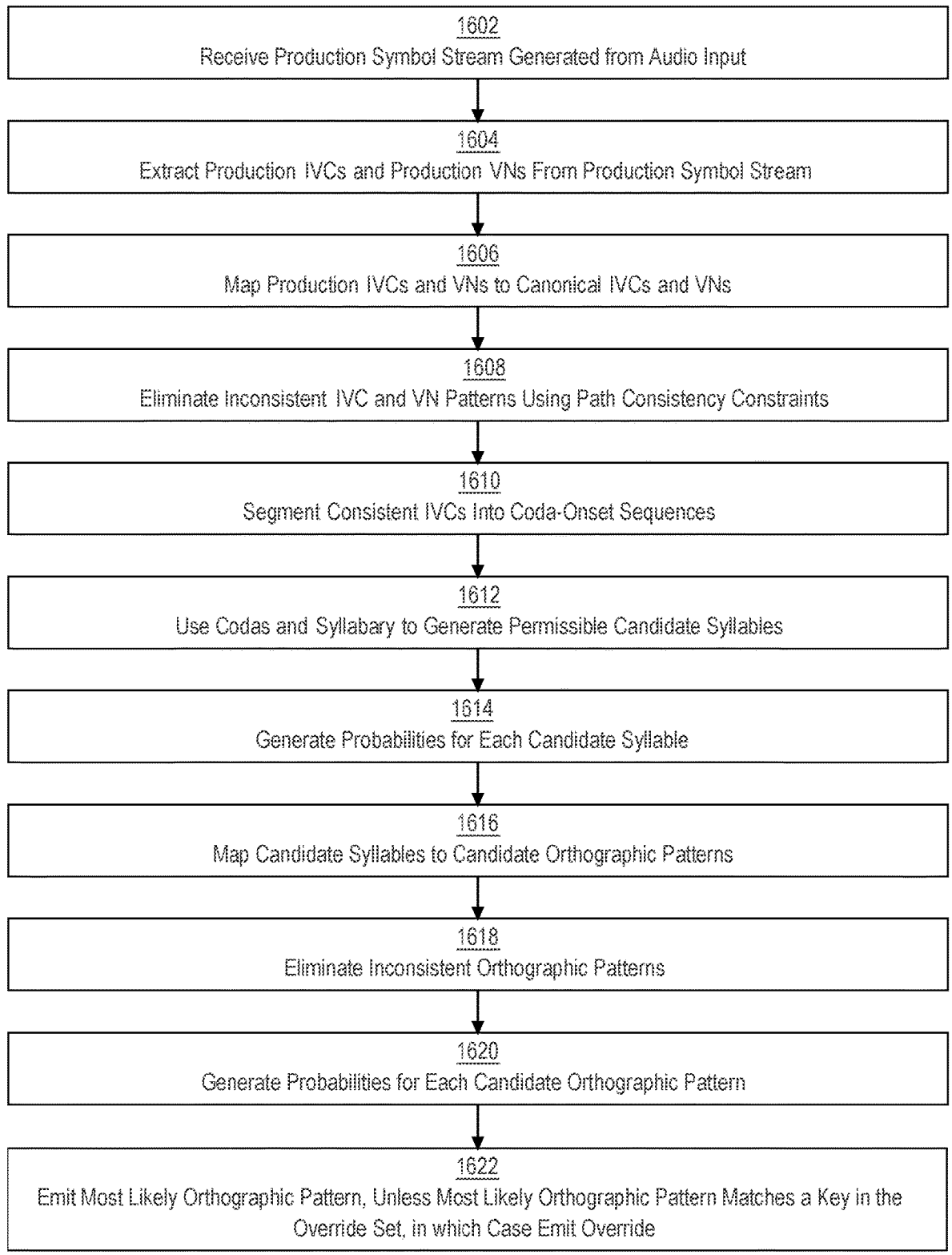
FIG. 16 depicts an example method of using a syllable structure to perform automatic speech recognition.

FIG. 16 depicts an example method of using a syllable structure to perform automatic speech recognition.

At step 1602, a production symbol stream generated from audio input is received. As an example, a computing system may receive audio input, such as through a television program. An acoustical recognizer may be used to generate production symbol streams from the audio input. A computing system may receive the production symbol stream for processing. For example, the computing system may be programmed or configured to generate captions for a television program.

At step 1604, production IVCs and VNs, as learned in Section 4.1.1 and FIG. 6, are identified in the production symbol stream as described in Section 4.2 and FIG. 9.

At step 1606, production IVCs and VNs are mapped to canonical IVCs and VNs, as described in Section 4.2 and FIG. 10, utilizing phonotactic patterns and conditional probabilities learned in the training process described in Section 4.1.2 and FIG. 7. At step 1608, as described in Section 4.2 and FIG. 11, path consistency constraints are used to eliminate inconsistent IVCs and VNs. A plurality of different canonical IVCs and VNs may be generated for any single production IVC or VN.

At step 1610, as described in Section 4.2 and FIG. 10, consistent IVCs are segmented into coda-onset sequences. At step 1612, as described in Section 4.2 and FIG. 11, the codas are used to generate candidate syllables and candidate syllables which are not in the syllabary are eliminated.

At step 1614, as described in Section 4.2 and as illustrated in FIG. 12, probabilities for each of the candidate syllables are generated. The probabilities for each of the candidate syllables are derived from the learned probabilities of the constituent onsets, codas and IVCs, normalized after the elimination of impermissible units and adjusted through the use of N-gram models.

At step 1616, as described in Section 4.2 and FIG. 13, candidate syllables are mapped to orthographic patterns through associations learned in the training process as described in Section 4.1.3 and FIG. 8, and in step 1618 inconsistent orthographic patterns are eliminated. A single candidate syllable may be mapped to multiple orthographic patterns.

At step 1620, as described in Section 4.2 and FIG. 14, probabilities for each of the orthographic patterns are generated using the probabilities of the constituent syllables learned in the training process as described in Section 4.1.4 and 4.1.5.

At step 1622, as described in Section 4.2 and FIG. 14, the most likely orthographic pattern is emitted, unless it matches a key in the expanded context override set learned in the training process as described in Section 4.1.6, in which case the override is emitted. In another embodiment, the dictionary is again consulted with respect to the n-most likely orthographic sequences and if an exact match is located, that match is emitted.

6. Benefits of Certain Embodiments

The computer-based process described herein employs a novel and unconventional combination of machine learning techniques and linguistic knowledge to convert phoneme and linguistic symbol patterns extracted from produced speech to canonical orthographically correct text. This distinctively different "back end" language processing component of an automated speech-to-text system is far more computationally efficient than the current state-of-the-art "language models". When coupled with an efficient acoustic processing "front end", the invention will enable continuous transcription of spoken words on distributed devices with high accuracy and low latency. It will be a valuable tool for all purposes to which automated speech recognition is employed, including but not limited to voice search, voice command-and-control of distributed devices and appliances, and voice dictation. It will be particularly useful in generating accurate real-time captions and subtitles on recorded and live video.

Captioning for live broadcasts requires high accuracy, little to no delay between the spoken words and the displayed captions, and the ability to produce captions for words that are not part of a pre-defined vocabulary list or are spoken with a different accent. It is difficult for a human to create such captions with high accuracy or at high speeds. By employing the rules described herein, a computer is able to break up received sound streams, employ specific sets of rules to identify the best candidate words, and output the candidate words at high accuracy and high speed, thereby allowing the output transcription to be played in real-time on a live broadcast. In addition, a nontrivial number of words in certain live programs such as news programs are previously unseen words such as proper nouns. The current state-of-the-art ASR systems can only emit words which are in their dictionaries which means they will always get these words wrong. This invention has the ability to emit phonetic approximations of words it has not seen before.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 17:
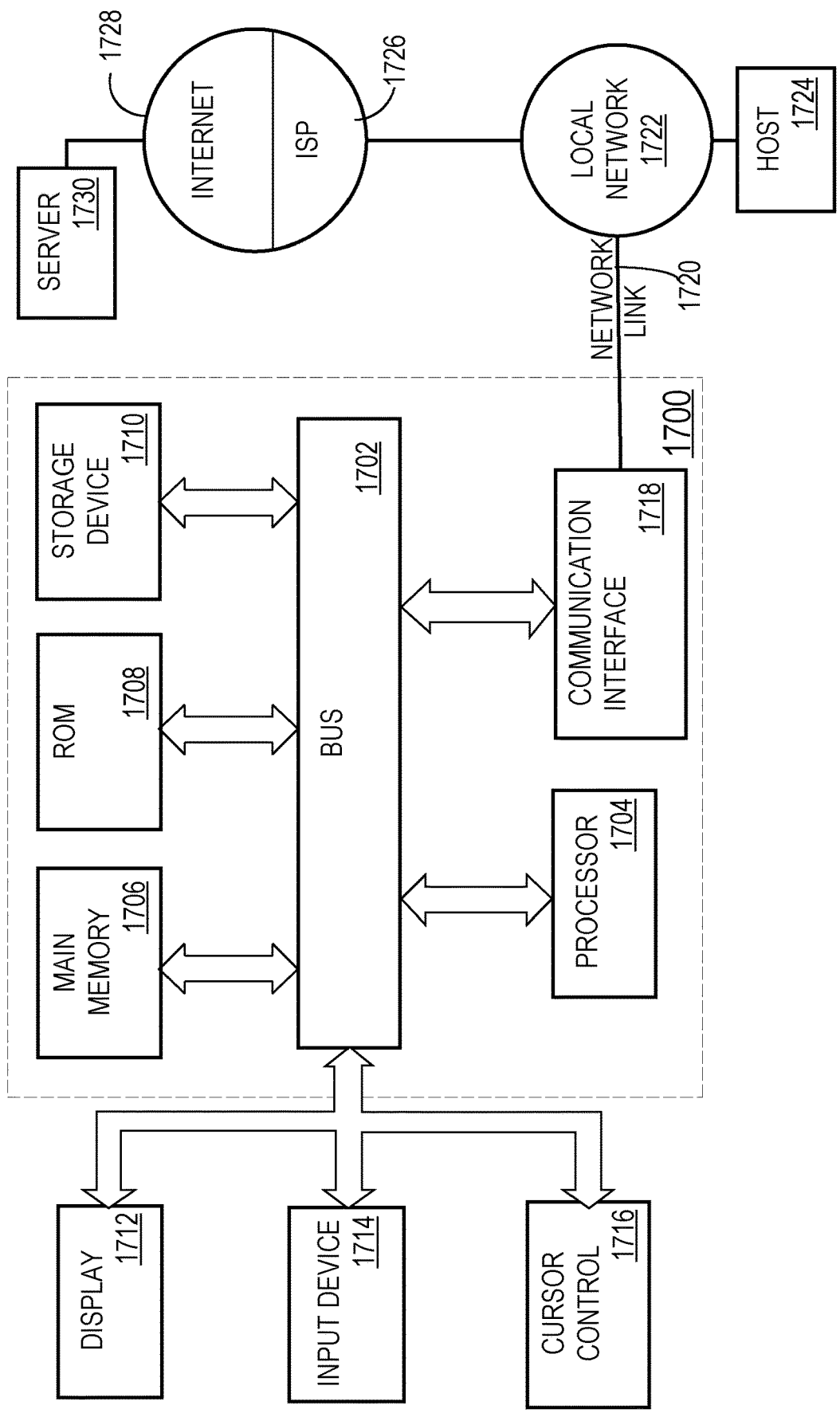
FIG. 17 is a block diagram that illustrates a computer system upon which an embodiment may be implemented.

For example, FIG. 17 is a block diagram that illustrates a computer system 1700 upon which an embodiment may be implemented. Computer system 1700 includes a bus 1702 or other communication mechanism for communicating information, and a hardware processor 1704 coupled with bus 1702 for processing information. Hardware processor 1704 may be, for example, a general purpose microprocessor.

Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Such instructions, when stored in non-transitory storage media accessible to processor 1704, render computer system 1700 into a special-purpose machine that is customized to perform the operations specified in the instructions.

Computer system 1700 further includes a read only memory (ROM) 1708 or other static storage device coupled to bus 1702 for storing static information and instructions for processor 1704. A storage device 1710, such as a magnetic disk, optical disk, or solid-state drive is provided and coupled to bus 1702 for storing information and instructions.

Computer system 1700 may be coupled via bus 1702 to a display 1712, such as a cathode ray tube (CRT), for displaying information to a computer user. An input device 1714, including alphanumeric and other keys, is coupled to bus 1702 for communicating information and command selections to processor 1704. Another type of user input device is cursor control 1716, such as a mouse, a trackball, or cursor direction keys for communicating direction information and command selections to processor 1704 and for controlling cursor movement on display 1712. This input device typically has two degrees of freedom in two axes, a first axis (e.g., x) and a second axis (e.g., y), that allows the device to specify positions in a plane.

Computer system 1700 may implement the techniques described herein using customized hard-wired logic, one or more ASICs or FPGAs, firmware and/or program logic which in combination with the computer system causes or programs computer system 1700 to be a special-purpose machine. According to one embodiment, the techniques herein are performed by computer system 1700 in response to processor 1704 executing one or more sequences of one or more instructions contained in main memory 1706. Such instructions may be read into main memory 1706 from another storage medium, such as storage device 1710. Execution of the sequences of instructions contained in main memory 1706 causes processor 1704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1710. Volatile media includes dynamic memory, such as main memory 1706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1702. Transmission media can also take the form of acoustic or light waves, such as those generated during radio-wave and infra-red data communications.

Various forms of media may be involved in carrying one or more sequences of one or more instructions to processor 1704 for execution. For example, the instructions may initially be carried on a magnetic disk or solid-state drive of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1718 coupled to bus 1702. Communication interface 1718 provides a two-way data communication coupling to a network link 1720 that is connected to a local network 1722. For example, communication interface 1718 may be an integrated services digital network (ISDN) card, cable modem, satellite modem, or a modem to provide a data communication connection to a corresponding type of telephone line. As another example, communication interface 1718 may be a local area network (LAN) card to provide a data communication connection to a compatible LAN. Wireless links may also be implemented. In any such implementation, communication interface 1718 sends and receives electrical, electromagnetic or optical signals that carry digital data streams representing various types of information.

Network link 1720 typically provides data communication through one or more networks to other data devices. For example, network link 1720 may provide a connection through local network 1722 to a host computer 1724 or to data equipment operated by an Internet Service Provider (ISP) 1726. ISP 1726 in turn provides data communication services through the world wide packet data communication network now commonly referred to as the "Internet" 1728. Local network 1722 and Internet 1728 both use electrical, electromagnetic or optical signals that carry digital data streams. The signals through the various networks and the signals on network link 1720 and through communication interface 1718, which carry the digital data to and from computer system 1700, are example forms of transmission media.

Computer system 1700 can send messages and receive data, including program code, through the network(s), network link 1720 and communication interface 1718. In the Internet example, a server 1730 might transmit a requested code for an application program through Internet 1728, ISP 1726, local network 1722 and communication interface 1718.

The received code may be executed by processor 1704 as it is received, and/or stored in storage device 1710, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing method comprising:
   receiving, at a computing system, a production symbol stream produced from spoken words of a particular language from an acoustic processing system;
   extracting, from the production symbol stream, a plurality of production patterns; using a stored production to canonical mapping comprising conditional probabilities for one or more mappings of production patterns to canonical patterns, generating candidate syllables and a probability of each candidate syllable from the plurality of production patterns, generating the candidate syllables comprising mapping a production phonotactic stream to a canonical phonotactic stream by performing, at least:

receiving an alternating stream of production Intervowel Consonant (IVC)s and Vowel Neighborhood (VN)s;

using a precomputed and stored database of aligned production and canonical IVCs which maps production IVCs to one or more canonical IVCs with stored associated conditional probabilities; and using a stored database of aligned production and canonical VNs, mapping production VNs to one or more canonical VNs with stored associated conditional probabilities;

using a stored syllable to orthographic pattern mapping comprising conditional probabilities for one or more mappings of candidate syllables to orthographic patterns, generating candidate orthographic patterns and a probability of each candidate orthographic pattern from the candidate syllables;

based, at least in part, on the probabilities for each candidate orthographic pattern, generating an orthographic representation of the production symbol stream.

2. The data processing method of claim 1, wherein the production stream is segmented into phonotactic units comprising IVC and VN units, by performing sequentially for each symbol of the production symbol stream:

initializing a three-symbol buffer to zero and an IVC accumulator buffer to zero and adding production symbols sequentially to the three-symbol buffer;

alter adding a symbol to the three-symbol buffer, determining if a middle symbol of the three-symbol buffer is a vowel and that the three symbols therefore comprise a VN, storing the VN;

if an added symbol is a consonant, appending that consonant to the IVC accumulator;

if the next added symbol is not a consonant, storing the symbols in the IVC accumulator as an IVC; and, continuing processing so long as the production stream continues.

3. The data processing method of claim 1, comprising further processing of the mapped canonical stream by:

determining whether each of the canonical IVCs is a consistent continuation of at least one member of an immediately previous set of canonical VN patterns and eliminating those which are not consistent with at least one such VN pattern;

determining whether each of the canonical VNs is a consistent continuation of at least one member of the immediately previous set of canonical IVC patterns and eliminating those which are not consistent with at least one such IVC pattern; and, after elimination of inconsistent IVCs and VNs, renormalizing the conditional probabilities.

4. The data processing method of claim 1, wherein generating the candidate syllables comprises:

segmenting consistent canonical IVC patterns into syllable coda-onset sequences;

using the coda portions of the segmented consistent canonical IVC patterns to complete consistent paths through onsets augmented from remaining IVC patterns and VN patterns, with each consistent path forming a candidate syllable;

eliminating candidate syllables not in a stored syllabary;

computing the probability of each candidate syllable; and, storing the candidate syllables.

5. The data processing method of claim 4, wherein generating a probability for each candidate syllable comprises:

for each candidate syllable of corresponding to a particular set of production symbols:

identifying a probability of the VN for the candidate syllable from the stored computed probabilities in the production to canonical mapping;

identifying a probability of an onset of the candidate syllable based on the stored computed probabilities in the production to canonical mapping for each canonical IVC from which the onset can be based;

identifying a probability of a coda of the candidate syllable based on the stored computed probabilities in the production to canonical mapping for each canonical IVC from which the coda can be based;

aggregating the probability of the VN, the probability of the onset, and the probability of the coda to a syllable probability value; and, normalizing a sum of the syllable probability values of the candidate syllables for the particular set of production symbols.

6. The data processing method of claim 1, wherein mapping of candidate syllables to orthographic patterns comprises:

storing data comprising aligned canonical syllabified pronunciations and orthographic syllable patterns;

initializing a queue to empty and presenting the candidate syllables sequentially and mapping to a learned and stored syllabified orthographic pattern set;

using word positional codes associated with the patterns to eliminate invalid patterns; and, storing the orthographic patterns.

7. The data processing method of claim 1, further comprising applying syllable position constraints and statistical models to select output orthographic patterns by:

sequentially processing orthographic patterns through a queue in the form of a sliding window of a plurality of syllable-sized units in which overlapping sequences of syllables are processed progressively;

referencing data stored in n-gram models to each set of received orthographic patterns as they are received;

summing the conditional probabilities of the n-gram models to generate path probabilities; and, storing the path probabilities.

8. The data processing method of claim 1, further comprising:

storing data comprising aligned production symbol patterns and canonical symbol pronunciations patterns;

for each combination of a production and canonical pronunciation symbol pattern in the stored data computing a probability of the pattern as a function of a value corresponding to a number of occurrences of the combination in the stored data and a value corresponding to a number of occurrences of the canonical pronunciation with a different production pronunciation;

storing the combinations of production and canonical pronunciations with corresponding computed probabilities of the combinations in the production to canonical mapping.

9. The data processing method of claim 1, further comprising:
storing data comprising aligned syllabified canonical pronunciations and orthographic patterns;
for each combination of a syllabified canonical pronunciation and orthographic pattern in the stored data computing a probability of the pattern as a function of a value corresponding to a number of occurrences of the combination in the stored data and a value corresponding to a number of occurrences of the syllabified canonical pronunciation in the stored data;
storing the combinations of syllabified canonical pronunciations and orthographic patterns with corresponding computed probabilities of the combinations in the production to canonical mapping.

10. The data processing method of claim 1, further comprising:
storing a running word corpus comprising transcribed spoken or written speech in a particular language;
storing a pronunciation dictionary comprising syllabified pronunciations and corresponding orthographic patterns of words of a particular language
using the pronunciation dictionary converting the running word corpus to a syllabified orthographic word database;
using the syllabified orthographic word database, accumulating association counts for each n-gram pattern and generating the probabilities for each candidate orthographic syllable pattern.

11. The data processing method of claim 1, further comprising:
storing a running word corpus comprising transcribed spoken or written speech in a particular language;
storing a pronunciation dictionary comprising syllabified pronunciations and corresponding orthographic patterns of words of a particular language
using the pronunciation dictionary converting the running word corpus to a pronunciation syllable database;
using the pronunciation syllable database, accumulating association counts for each n-gram pattern and generating the probabilities for each candidate pronunciation syllable pattern.

12. The data processing method of claim 1, further comprising:
during training, where the most likely orthographic syllable pattern generated by the system does not match the target orthographic pattern;
storing an expanded context of multi-syllable sequences containing the unexpected orthographic syllable pattern;
at recognition time, matching each orthographic syllable pattern generated by the system to see if it matches any of the stored sequences; and,
if so, storing the expanded context sequence, and if not, storing the most likely orthographic pattern.

13. The data processing method of claim 6, further comprising:
storing a pronunciation dictionary containing orthographic patterns aligned to their syllabified canonical pronunciation patterns where the syllabification includes word positional notations and is accomplished using the maximum onset principle.

14. The data processing method of claim 1, wherein the production symbol stream is generated using digitally programmed logic of a computer system from audio input of a television program, the method further comprising:
causing displaying, on a display device displaying the television program, the orthographic representation as a caption for the television program.

15. A system comprising:
one or more processors;
a memory storing instructions which, when executed by the one or more processors, cause performance of:
receiving a production symbol stream produced from spoken words of a particular language from an acoustic processing system;
extracting, from the production symbol stream, a plurality of production patterns;
using a stored production to canonical mapping comprising conditional probabilities for one or more mappings of production patterns to canonical patterns, generating candidate syllables and a probability of each candidate syllable from the plurality of production patterns, generating the candidate syllables comprising mapping a production phonotactic stream to a canonical phonotactic stream by performing, at least:
receiving an alternating stream of production Intervowel Consonant (IVC)s and Vowel Neighborhood (VN)s;
using a precomputed and stored database of aligned production and canonical IVCs which maps production IVCs to one or more canonical IVCs with stored associated conditional probabilities; and
using a stored database of aligned production and canonical VNs, mapping production VNs to one or more canonical VNs with stored associated conditional probabilities;
using a stored syllable to orthographic pattern mapping comprising conditional probabilities for one or more mappings of candidate syllables to orthographic patterns, generating candidate orthographic patterns and a probability of each candidate orthographic pattern from the candidate syllables;
based, at least in part, on the probabilities for each candidate orthographic pattern, generating an orthographic representation of the production symbol stream.

16. The system of claim 15, wherein the production stream is segmented into phonotactic units comprising IVC and VN units, by performing sequentially for each symbol of the production symbol stream:
initializing a three-symbol buffer to zero and an IVC accumulator buffer to zero and adding production symbols sequentially to the three-symbol buffer;
after adding a symbol to the three-symbol buffer, determining if a middle symbol of the three-symbol buffer is a vowel and that the three symbols therefore comprise a VN, storing the VN;
if an added symbol is a consonant, appending that consonant to the IVC accumulator;
if the next added symbol is not a consonant, storing the symbols in the IVC accumulator as an IVC; and,
continuing processing so long as the production stream continues.

17. The system of claim 15, wherein the instructions, when executed by the one or more processors, further cause performance of further processing of the mapped canonical stream by:
determining whether each of the canonical IVCs is a consistent continuation of at least one member of an immediately previous set of canonical VN patterns and eliminating those which are not consistent with at least one such VN pattern;

determining whether each of the canonical VNs is a consistent continuation of at least one member of the immediately previous set of canonical IVC patterns and eliminating those which are not consistent with at least one such IVC pattern; and, after elimination of inconsistent IVCs and VNs, renormalizing the conditional probabilities.

18. The system of claim 15, wherein generating the candidate syllables comprises:
   segmenting consistent canonical IVC patterns into syllable coda-onset sequences;
   using the coda portions of the segmented consistent canonical IVC patterns to complete consistent paths through onsets augmented from remaining IVC patterns and VN patterns, with each consistent path forming a candidate syllable;
   eliminating candidate syllables not in a stored syllabary;
   computing the probability of each candidate syllable; and,
   storing the candidate syllables.

19. The system of claim 18,
   wherein generating a probability for each candidate syllable comprises:
   for each candidate syllable of corresponding to a particular set of production symbols:
   identifying a probability of the VN for the candidate syllable from the stored computed probabilities in the production to canonical mapping;
   identifying a probability of an onset of the candidate syllable based on the stored computed probabilities in the production to canonical mapping for each canonical IVC from which the onset can be based;
   identifying a probability of a coda of the candidate syllable based on the stored computed probabilities in the production to canonical mapping for each canonical IVC from which the coda can be based;
   aggregating the probability of the VN, the probability of the onset, and the probability of the coda to a syllable probability value; and,
   normalizing a sum of the syllable probability values of the candidate syllables for the particular set of production symbols.

20. The system of claim 15, wherein mapping of candidate syllables to orthographic patterns comprises:
   storing data comprising aligned canonical syllabified pronunciations and orthographic syllable patterns;
   initializing a queue to empty and presenting the candidate syllables sequentially and mapping to a learned and stored syllabified orthographic pattern set;
   using word positional codes associated with the patterns to eliminate invalid patterns; and,
   storing the orthographic patterns.

21. The system of claim 15, wherein the instructions, when executed by the one or more processors, further cause performance of applying syllable position constraints and statistical models to select output orthographic patterns by:
   sequentially processing orthographic patterns through a queue in the form of a sliding window of a plurality of syllable-sized units in which overlapping sequences of syllables are processed progressively;
   referencing data stored in n-gram models to each set of received orthographic patterns as they are received;
   summing the conditional probabilities of the n-gram models to generate path probabilities; and,
   storing the path probabilities.

22. The system of claim 15, wherein the instructions, when executed by the one or more processors, further cause performance of:
   storing data comprising aligned production symbol patterns and canonical symbol pronunciations patterns;
   for each combination of a production and canonical pronunciation symbol pattern in the stored data computing a probability of the pattern as a function of a value corresponding to a number of occurrences of the combination in the stored data and a value corresponding to a number of occurrences of the canonical pronunciation with a different production pronunciation;
   storing the combinations of production and canonical pronunciations with corresponding computed probabilities of the combinations in the production to canonical mapping.

23. The system of claim 15, wherein the instructions, when executed by the one or more processors, further cause performance of:
   storing data comprising aligned syllabified canonical pronunciations and orthographic patterns;
   for each combination of a syllabified canonical pronunciation and orthographic pattern in the stored data computing a probability of the pattern as a function of a value corresponding to a number of occurrences of the combination in the stored data and a value corresponding to a number of occurrences of the syllabified canonical pronunciation in the stored data;
   storing the combinations of syllabified canonical pronunciations and orthographic patterns with corresponding computed probabilities of the combinations in the production to canonical mapping.

24. The system of claim 15, wherein the instructions, when executed by the one or more processors, further cause performance of:
   storing a running word corpus comprising transcribed spoken or written speech in a particular language;
   storing a pronunciation dictionary comprising syllabified pronunciations and corresponding orthographic patterns of words of a particular language
   using the pronunciation dictionary converting the running word corpus to a syllabified orthographic word database;
   using the syllabified orthographic word database, accumulating association counts for each n-gram pattern and generating the probabilities for each candidate orthographic syllable pattern.

25. The system of claim 15, wherein the instructions, when executed by the one or more processors, further cause performance of:
   storing a running word corpus comprising transcribed spoken or written speech in a particular language;
   storing a pronunciation dictionary comprising syllabified pronunciations and corresponding orthographic patterns of words of a particular language
   using the pronunciation dictionary converting the running word corpus to a pronunciation syllable database;
   using the pronunciation syllable database, accumulating association counts for each n-gram pattern and generating the probabilities for each candidate pronunciation syllable pattern.

26. The system of claim 15, wherein the instructions, when executed by the one or more processors, further cause performance of:
   during training, where the most likely orthographic syllable pattern generated by the system does not match the target orthographic pattern;
   storing an expanded context of multi-syllable sequences containing the unexpected orthographic syllable pattern;

at recognition time, matching each orthographic syllable pattern generated by the system to see if it matches any of the stored sequences; and, if so, storing the expanded context sequence, and if not, storing the most likely orthographic pattern.

27. The system of claim 19, wherein the instructions, when executed by the one or more processors, further cause performance of:

storing a pronunciation dictionary containing orthographic patterns aligned to their syllabified canonical pronunciation patterns where the syllabification includes word positional notations and is accomplished using the maximum onset principle.

28. The system of claim 15:

wherein the production symbol stream is generated using digitally programmed logic of a computer system from audio input of a television program;

wherein the instructions, when executed by the one or more processors, further cause performance of causing displaying, on a display device displaying the television program, the orthographic representation as a caption for the television program.

* * * * *

UNITED STATES PATENT AND TRADEMARK OFFICE
CERTIFICATE OF CORRECTION

| | | |
|---|---|---|
| PATENT NO. | : 10,916,235 B2 | Page 1 of 1 |
| APPLICATION NO. | : 16/031637 | |
| DATED | : February 9, 2021 | |
| INVENTOR(S) | : Mark B. Pinson et al. | |

It is certified that error appears in the above-identified patent and that said Letters Patent is hereby corrected as shown below:

On the Title Page

Item (73) IN THE ASSIGNEE:
Delete "Vox Frontera, Inc." and insert -- SCTI Holdings, Inc. --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*